United States Patent [19]
Maeda et al.

[11] Patent Number: 5,878,013
[45] Date of Patent: Mar. 2, 1999

[54] RECORDING AND REPRODUCING APPARATUS

[75] Inventors: Shinichi Maeda; Ichiro Kawamura, both of Osaka, Japan

[73] Assignee: Matsushita Electric Industrial Co., Ltd., Osaka, Japan

[21] Appl. No.: 710,541

[22] Filed: Sep. 19, 1996

[30] Foreign Application Priority Data

Sep. 20, 1995 [JP] Japan ................................. 7-241155

[51] Int. Cl.$^6$ .................................................. G11B 33/02
[52] U.S. Cl. ............................................................ 369/77.1
[58] Field of Search ................................. 369/77.1, 77.2, 369/75.2, 75.1; 360/99.06, 99.05, 99.12, 96.6, 96.5, 99.07

[56] References Cited

U.S. PATENT DOCUMENTS

| | | | |
|---|---|---|---|
| 4,773,058 | 9/1988 | Petruchik et al. | 369/77.2 |
| 4,862,445 | 8/1989 | Sasaki | 369/75.2 |
| 5,123,004 | 6/1992 | Arai | 369/75.2 |
| 5,499,233 | 3/1996 | Childers et al. | 369/291 |

FOREIGN PATENT DOCUMENTS

| | | |
|---|---|---|
| 0 351 191 | 1/1990 | European Pat. Off. . |
| 0 403 266 | 12/1990 | European Pat. Off. . |
| 0 645 768 | 3/1995 | European Pat. Off. . |
| 61-172264(A) | 8/1986 | Japan . |
| 61-206961 | 9/1986 | Japan . |
| 61-206961(A) | 9/1986 | Japan . |
| 6-111444 | 4/1994 | Japan . |
| 6-333311 | 12/1994 | Japan . |
| 7-161112 | 6/1995 | Japan . |
| 08180535(A) | 7/1996 | Japan . |

*Primary Examiner*—Stuart S. Levy
*Assistant Examiner*—Kenneth Fields
*Attorney, Agent, or Firm*—McDermott, Will & Emery

[57] ABSTRACT

It is an object of the invention to present a recording and reproducing apparatus capable of mounting a bare disk and a cartridge selectively on a tray, without dropping from the tray in vertical position.

To achieve the object, the invention comprises a turntable engaged with a disk for supporting the disk on a recording and reproducing position, a pickup for moving on the surface of the disk to record a signal in the disk or to reproduce a signal from the disk, and a flat tray for transferring between an engagement position with the turntable and a disk exchange position while holding the disk in a position so that its side may be at least in vertical position, wherein the tray possesses a first disk engaging portion freely movable in a tray transfer direction, being thrust in a disk exchange position direction of the tray, for detachably supporting the peripheral edge of the disk or one side of a cartridge, and a second disk engaging portion having a state of holding the peripheral edge of the disk together with the first disk engaging portion in a vertical position of the side of the disk, and a state of sinking into a holding surface, on the holding surface, and the holding surface possesses a cartridge mounting portion for detachably holding a cartridge incorporating a disk.

22 Claims, 17 Drawing Sheets

FIG. 16(a)
FIG. 16(b)
FIG. 16(c)
FIG. 16(d)
FIG. 16(e)
FIG. 16(f)
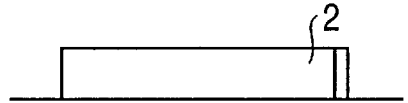
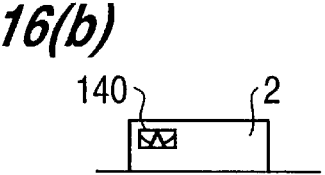
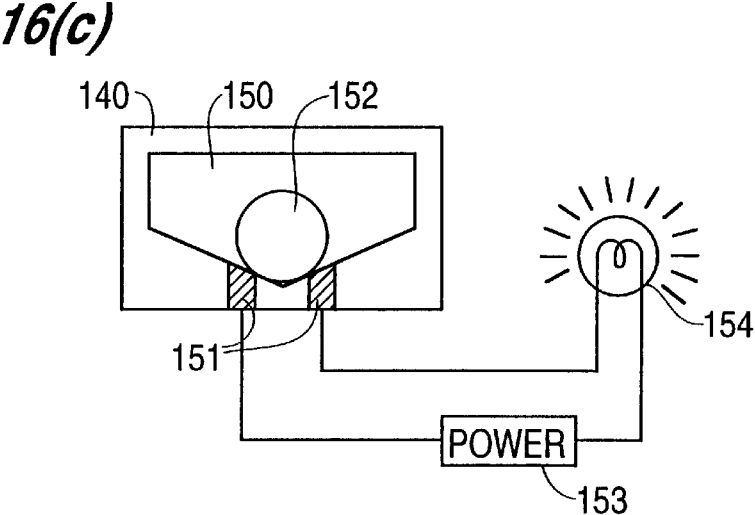
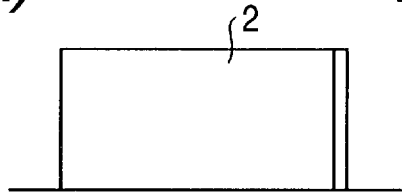
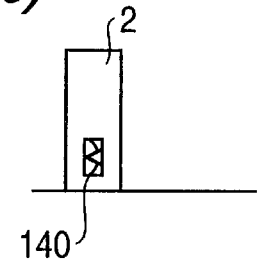
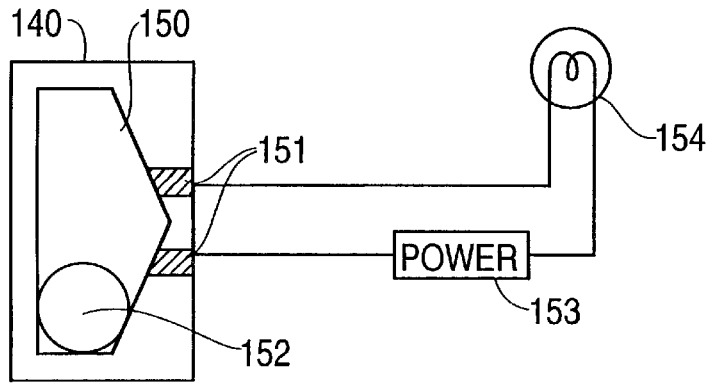

RECORDING AND REPRODUCING APPARATUS

FIELD OF THE INVENTION

The present invention relates to a recording and reproducing apparatus capable of mounting both an independent disk such as optical disk or high density recording medium, and a cartridge incorporating a disk, which can be driven if at least the disk side is set upright.

BACKGROUND OF THE INVENTION

At the present, as the recording medium of information appliance such as computer, the read-only disk such as CD-ROM, and the erasable disk of optomagnetic type or phase change type are used.

These disks are either mounted directly on a tray, or once incorporated into a cartridge to protect the disk surface, and the cartridge is mounted on a tray.

In such recording and reproducing apparatus, for example, when mounting a disk directly on a tray, the tray is loaded from the disk exchange position to the recording and reproducing position by means of a disk loading device, the disk is put on a turntable, the disk is rotated by the turntable, and the pickup is moved on the surface of the disk to record or reproduce.

When mounting a cartridge on the tray, the recording and reproducing method is same, but since the disk is put on the turntable to scan by the pickup, the disk protective lid of the cartridge is opened in the midst of loading of the tray.

Recently, not limited to the recording and reproducing apparatus having a tray for disk only, and the recording and reproducing apparatus having a tray for cartridge only, recording and reproducing apparatuses having a tray capable of mounting disk and cartridge selectively have been proposed (Japanese Laid-open Patent 7-161112, etc.). In the latter case, a disk mounting portion and a cartridge mounting portion are disposed on the tray.

It was, however, a demerit of such conventional recording and reproducing apparatus that the tray could not be used in vertical position.

Use of tray in vertical position is demanded among users of recording and reproducing apparatus in order to save space when using it as an external memory device of a computer or the like. It is also demanded among manufacturers of recording and reproducing apparatus in order to enhance the working efficiency in assembly or inspection of the recording and reproducing apparatus.

According to these demands, if the conventional recording and reproducing apparatus is used in vertical disk position, the disk which is only put on the tray drops easily, and if the disk is successfully loaded into the recording and reproducing apparatus, when the tray is taken out of the recording and reproducing apparatus, the disk drops off the tray, and the disk surface is damaged and the signal may not be reproduced. Or the clamp hole for mounting the disk may not be correctly engaged in the center of the turntable which is a rotary support table of the recording and reproducing apparatus.

SUMMARY OF THE INVENTION

It is therefore a first object of the invention to present a recording and reproducing apparatus capable of mounting a disk and a cartridge selectively on a tray, without dropping off the tray in vertical position.

To achieve the object, the first invention of the recording and reproducing apparatus of the invention comprises a turntable engaged with a disk for supporting the disk on a recording and reproducing position, a pickup for moving on the surface of the disk to record a signal in the disk or to reproduce a signal from the disk, and a flat tray for transferring between an engagement position with the turntable and a disk exchange position while holding the disk in a position so that its side may be at least in vertical position, wherein the tray possesses a first disk engaging portion freely movable in a tray transfer direction, being thrust in a disk exchange position direction of the tray, for detachably supporting the peripheral edge of the disk or one side of a cartridge, and a second disk engaging portion having a state of holding the peripheral edge of the disk together with the first disk engaging portion in a vertical position of the side of the disk, and a state of sinking into a holding surface, on the holding surface, and the holding surface possesses a cartridge mounting portion for detachably holding a cartridge incorporating a disk.

According to the invention, even if the disk side is in vertical position, the disk can be loaded in the recording and reproducing apparatus by the function of the first and second disk engaging portions for detachably supporting the peripheral edge of the disk, and the cartridge is held in the cartridge mounting portion of the tray, so that the disk and cartridge may be selectively mounted on the tray, without fall of the disk from the tray in vertical position. The tray is transferred from the disk exchange position to the recording and reproducing position to be recorded or reproduced, or transferred in the reverse direction, so that the disk can be replaced.

It is a second object of the invention to present means for changing the manner of holding the disk, depending on the position, by distinguishing the position of the recording and reproducing apparatus, that is, whether the disk side is horizontal or vertical.

To achieve the object, the second invention of the recording and reproducing apparatus of the invention comprises a turntable engaged with a disk for supporting the disk on a recording and reproducing position, a pickup for moving on the surface of the disk to record a signal in the disk or to reproduce a signal from the disk, a flat tray for transferring between an engagement position with the turntable and a disk exchange position while holding the disk in a position so that its side may be in horizontal position or vertical position, position specifying means for issuing a signal showing either horizontal position or vertical position of the tray, and driving means driven by the signal issued by the position specifying means, wherein the tray possesses a first disk engaging portion freely movable in a tray transfer direction, being thrust in a disk exchange position direction of the tray, for detachably supporting the peripheral edge of the disk, and a second disk engaging portion having a state of holding the peripheral edge of the disk together with the first disk engaging portion by projecting from the holding surface by the driving means when the vertical position of the tray is detected by the position specifying means, and a state of sinking into the holding surface by the driving means when the horizontal position of the tray is detected by the specifying means, on the holding surface, and the holding surface possesses a cartridge mounting portion for detachably holding a cartridge incorporating a disk.

According to the invention, when the vertical position of the disk is detected by the position specifying means, the second disk engaging portion projects from the holding surface by the driving means so as to hold the peripheral edge of the disk together with the first engaging portion, or when the horizontal position of the tray is detected by the position detecting means, the second disk engaging portion sinks into the holding surface by the driving means, so that the user can load securely into the recording and reproducing apparatus, only by inserting the disk or cartridge without being conscious of the position of the disk.

The first and second main inventions may be variously changed and modified, and the following actions and effects can be added to the actions and effects of the main inventions.

In accordance with the foregoing embodiments, the holding surface possesses a disk mounting portion for positioning and mounting the disk when the tray is set in horizontal position, whereby the disk suited to the size of the disk mounting portion can be mounted while using in horizontal position, and the apparatus can be used in both horizontal and vertical positions.

In addition, the disk holding surface of tray is inclined from the horizontal surface so that the inner side may be higher to avoid abutting of the disk against the turntable, when the disk mounting portion for positioning and mounting the disk, with the tray in horizontal position, moves the tray from the disk exchange position to the recording and reproducing position of disk, whereby it is easy to mount, and the disk is prevented from abutting against the turntable while moving from the disk exchange position to the recording and reproducing position of the disk, so that the apparatus may be reduced in thickness.

Moreover, the second disk engaging portion is provided line symmetrically in the vertical direction of tray in the vertical position of tray, whereby the side of the tray for mounting the disk can be disposed at either right side or left side to the tray as desired, so that it is easier to used.

Furthermore, the second disk engaging portion is disposed outside of the disk mounting portion, whereby the tray central part is open widely when mounting the disk on the tray, and the disk hardly hits against the second disk engaging portion, so that it is easy to handle and mount.

In addition, the second disk engaging portion is disposed in the cartridge mounting portion so as to be free to move in and out, whereby if the cartridge is mounted instead of mounting the disk, the second disk engaging portion is pressed by the cartridge and sinks below the mounting surface, so that it may be mounted without trouble, and moreover the disk can be held by making use of the space in the cartridge mounting portion.

Further, the second disk engaging portion is thrust in the projecting direction, whereby if sinking when the cartridge is mounted, it is projected by detaching the cartridge, so that the disk can be mounted readily, and the operation for moving in or out the second disk engaging portion is not needed.

The second disk engaging portion is also disposed in the cartridge mounting portion so as to be free to move in and out, and is thrust in the projecting direction.

The second disk engaging portion is detachably disposed in the cartridge mounting portion, whereby it is enough to detach the second disk engaging portion when mounting the cartridge, so that the second disk engaging portion does not impede the disk when using in horizontal direction.

The second disk engaging portion is selectively changed over between the projecting position and sinking position, whereby the second disk engaging portion is not detached by fitting the second disk engaging portion in the sinking position when mounting the cartridge, so that it may not be lost, and it is not necessary to prepare a storing place.

BRIEF DESCRIPTION OF THE DRAWINGS

FIG. 16 shows position specifying means of the second embodiment of the invention, (a) being a side view of a state of installation of a housing of a recording and reproducing apparatus on a horizontal plane so that the tray may be in horizontal position, (b) its front view, (c) a sectional view of the position specifying means at this time, (d) a side view of a state of installation of the housing of the recording and reproducing apparatus on a horizontal plane so that the tray may be in a vertical position, (e) its front view, and (f) a sectional view of the position specifying means at this time.

DETAILED DESCRIPTION OF THE EMBODIMENTS

A first embodiment of the invention is described in FIG. 1 through FIG. 14. That is, this recording and reproducing apparatus is designed to record or reproduce a signal by mounting any one of one or plural types of independent disk differing in size, or any one of one or plural types of disk accommodated in a cartridge, on a tray.

Figure 1A:
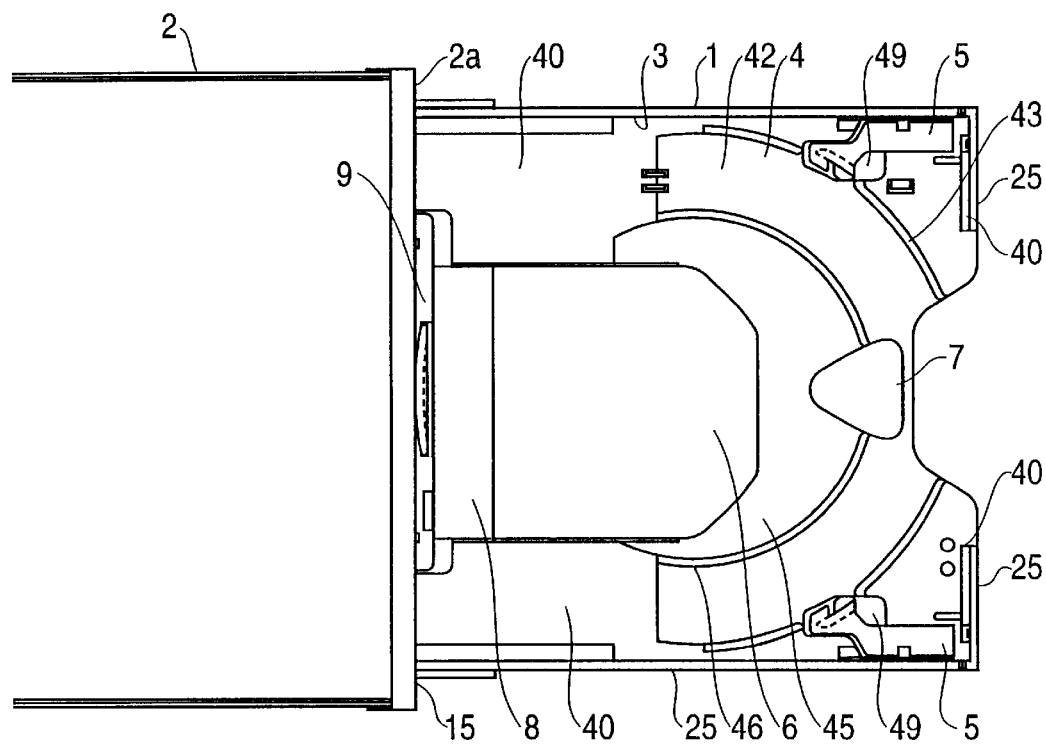
FIG. 1 shows a recording and reproducing apparatus with a tray in a vertical position and a disk engaging portion in a projected state, according to a first embodiment of the invention, (a) being a side view and (b) a bottom view showing a section of the tray portion.
Figure 1B:
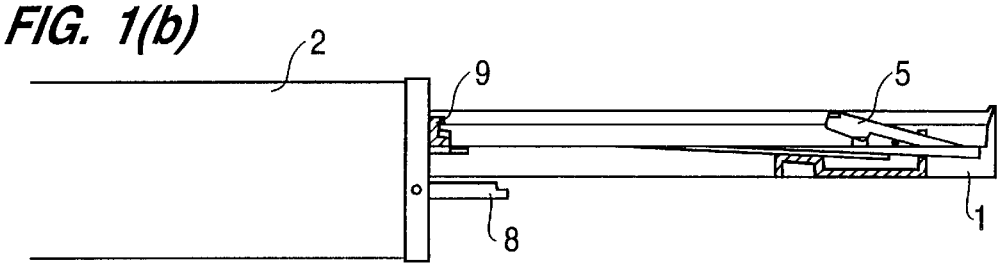
Figure 2:
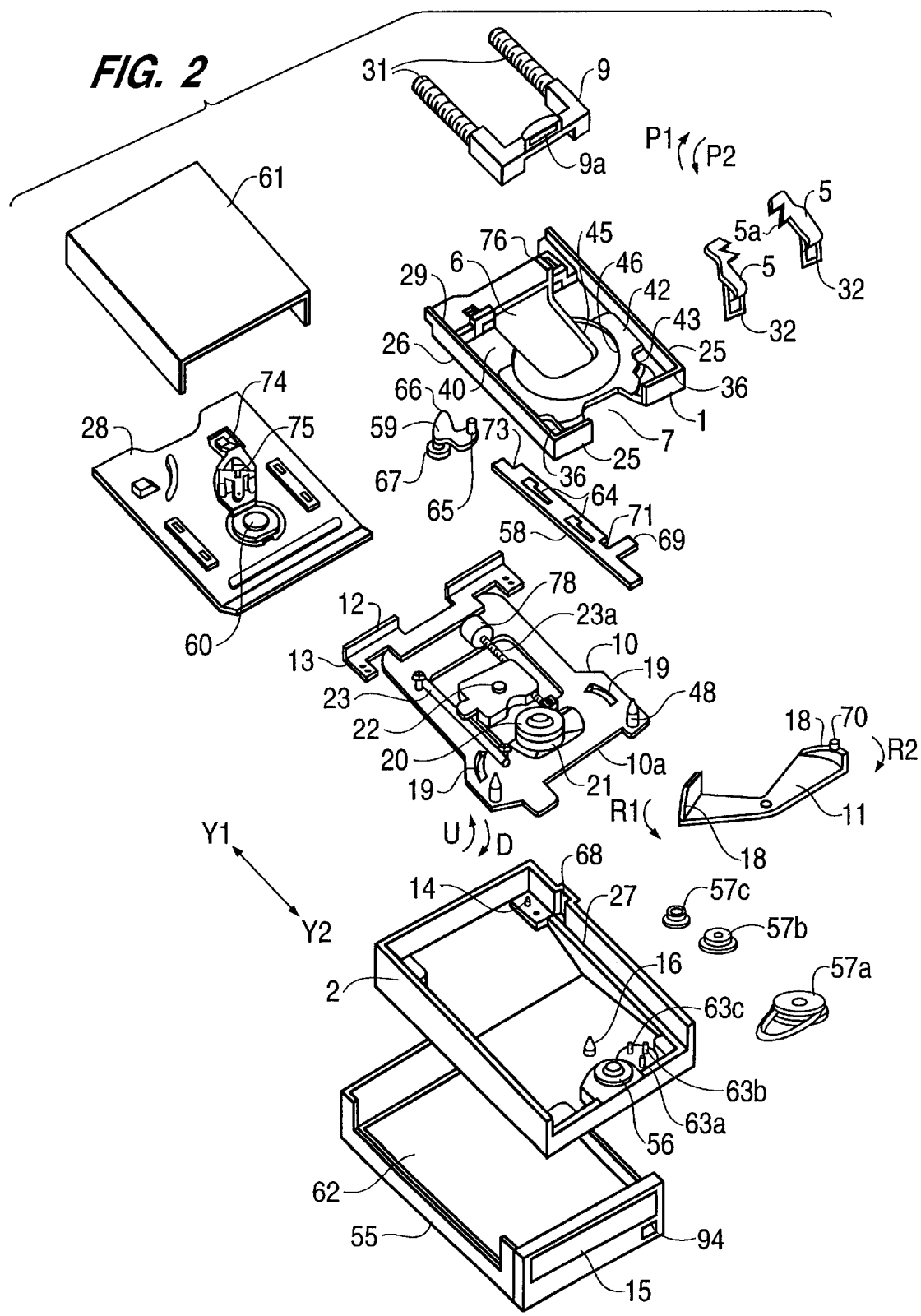
FIG. 2 is an exploded perspective view of the recording and reproducing apparatus of the embodiment of the invention.

FIG. 1 shows a tray 1 in vertical position projecting in a disk exchange position from an access opening 15 in FIG. 2 of a housing 2 of a recording and reproducing apparatus, and (a) is a side view of disk holding side.

A front panel 2a of the housing 2 of the recording and reproducing apparatus has a shutter 8 for blocking a front opening 15 of the housing 2 when accommodating the tray 1, provided so as to open by axis about the side surface side of the tray.

The tray 1 has a cartridge mounting portion 3, and the tray 1 also has a disk mounting portion 4 sinking in a disk form in a size of the disk for mounting the disk in horizontal position of the tray 1.

The tray 1 further comprises a disk engaging portion 5 projecting to the holding side, for holding the disk in vertical position, and a hole 6 and a notch 7 for attaching or detaching the disk are also provided in the tray 1.

FIG. 2 is a perspective view of the recording and reproducing apparatus of the invention. A main chassis 10 and a main lever 11 are provided in the housing 2.

In the housing 2, in order to fix an L-section torsion leaf 12 provided in the main chassis 10 by screw or other fixing means at its both end holes 13, a boss 14 is provided at two positions in the inner bottom. The top of the boss 14 is inclined so as to descend slightly toward the direction of the access opening 15 at the front end of the housing 2, so that the leading end 10a of the main chassis 10 is always thrust in the direction of arrow D when the torsion leaf 12 is fixed in the bosses 14.

Inside the housing 2 there is a shaft 16 for rotatably pivoting the main lever 11. The main chassis 10 being thrust in the direction of arrow D as mentioned above is engaged with a slit 19 of the main chassis 10 by a slope 18 when the main lever 11 is turned in the direction of arrow R1 by driving means such as motor with reduction gear as mentioned later, and the leading end 10a of the main chassis 10 is pushed up in the direction of arrow U, resisting the spring thrusting force of the torsion leaf 12, so that the main chassis 10 may be nearly horizontal in FIG. 2. At this time, the main chassis 10 is supported on the horizontal plane of the end portion of the slope 18. When the main lever 11 is turned in the direction of arrow R2 by a motor 56, the main chassis 10 in inclined in the direction of arrow D from the horizontal position by the thrusting force of the torsion leaf 12 along the slope 18 of the main lever 11.

The main chassis 10 is provided with a turntable 20 at the recording and reproducing position of disk. The turntable 20 is driven by a disk motor 21 which is coupled to its rotary shaft. A pickup 22 reciprocating in the radial direction of the turntable 20 is provided movably on a guide shaft 23, and a spiral groove is formed on other guide shaft 23a, and a nut to be engaged therewith is provided in the pickup 22, and the guide shaft 23a having a spiral groove is rotated by a motor 78, thereby removing the pickup 22 reciprocally. The pickup 22 has a laser emitting unit for reproduction and a sensor unit for receiving the reflected light of the disk.

In FIG. 2, suppose the tray 1 is placed horizontally. The tray 1 is a flat plate, and has a wall 25 provided in the periphery. The bottom plate side 26 of the wall 25 slides on two guide ribs 27 provided at the inner side of the housing 2, and a lid 28 for closing the top of the housing 2 is holding the tray 1 movable in the direction of arrow Y1–Y2 by guiding the upper end 29 of the wall 25 in FIG. 2 by a slight clearance, and the disk exchange position is a position of the tray 1 projecting from the front opening 15 of the housing 2 as shown in FIG. 1. Meanwhile, sliding and holding of the tray 1 in the housing 2 is not limited to the above means alone, but. the wall 25 of the tray 1 may be held by two upper and lower ribs, or a groove may be provided in the side of the tray 1, and one rib to be fitted therein may be provided at the housing 2 side.

In the tray 1 in FIG. 2, a disk holding portion 9 which is a first disk holding portion being thrust by a drive spring 31 is projecting, penetrating through a wall 76, in the direction of arrow Y2. The disk holding portion 9 is provided with a pawl (not shown) abutting against the wall 76, and it is thrust by the drive spring 31 so that the groove 9a may come to the specified position of the tray 1 and wait.

Figure 14A:
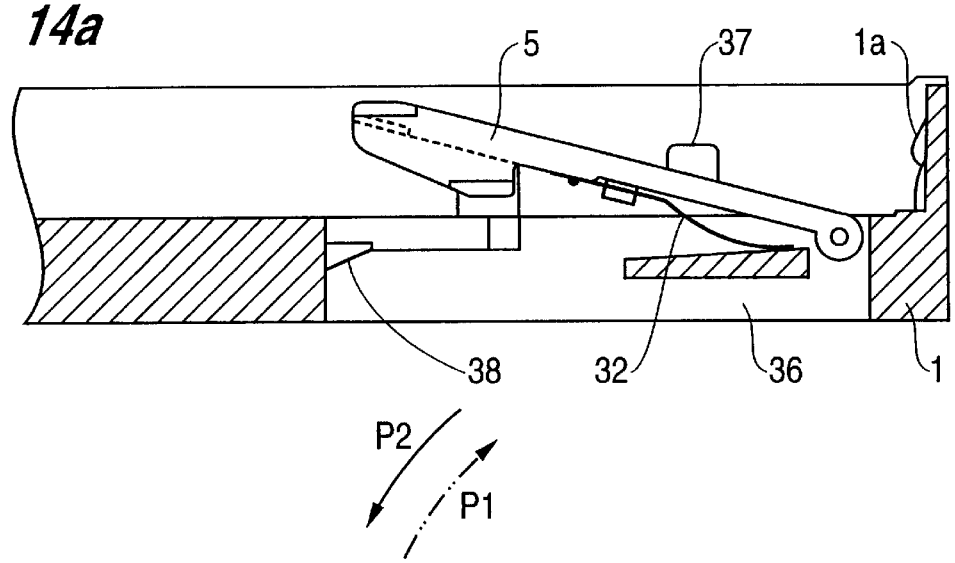
FIG. 14 shows an operating state of the disk engaging portion in the first embodiment of the invention, (a) being a diagram showing a projecting state, (b) a diagram showing a automatically resettable sinking state, and (c) a sectional view showing a sinking fixed state.
Figure 14B:
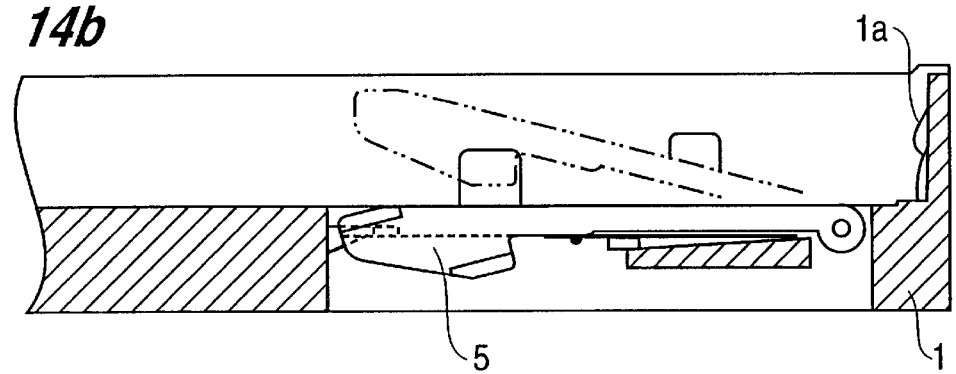
Figure 14C:
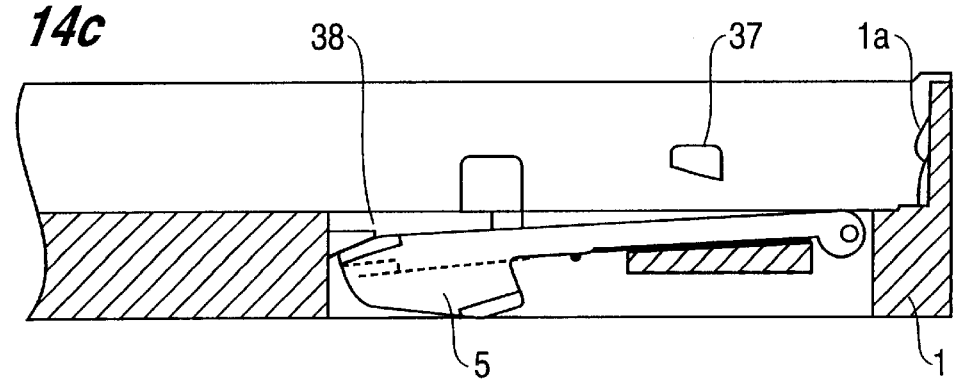

In a groove 36 at both sides in the drawing of the tray in FIG. 2, a disk engaging portion 5 is provided as a second disk engaging portion rotatably provided in the direction of arrow P1–P2, and it is thrust by a pressure spring 32 in the direction of arrow P1, that is, in the direction departing from the tray 1. FIG. 14 explains the operation of the disk engaging portion 5. FIG. 14 (a) shows the position of the disk engaging portion 5 when holding a large disk 92 not shown in the drawing in the vertical position, and the disk engaging portion 5 being thrust by the pressure spring 32 is limited in rotation by abutting against a rib 37 of the tray 1.

FIG. 14 (b) shows the state of tray mounting of a cartridge 90 not shown in this drawing, and when the cartridge 90 is mounted, the disk engaging portion 5 turns from the position in FIG. 14 (a) in the direction of arrow P2 to be in the state of FIG. 14 (b), and when the cartridge 90 is taken out, it is automatically reset to the state in FIG. 14 (a).

FIG. 14 (c) shows the state of accommodating the disk engaging portion 5 into the tray 1, in which the disk engaging portion 5 is elastically deformed in the groove 36 of the tray 1, and a rib 38 of the tray 1 and the top of the disk engaging portion 5 abut against each other, so that the disk engaging portion 5 may be fixed in the tray 1. By clearing engagement with the rib 38, it is automatically reset into the state in FIG. 14 (a). Besides, although not shown, it may be also constituted so that the disk engaging portion 5 may be detached from the tray 1.

The tray 1 in FIG. 2 is formed in a complicated shape on the top so as to mount a cartridge accommodating a disk inside or one or plural types of independent disk. The following explanation relates to an example of mounting a cartridge, a large disk, and a small disk when the mounting surface of the tray 1 is in horizontal position. First, the cartridge mounting portion 3 shown in FIG. 1 is a place for mounting the cartridge, and it is supported by the mounting surface 40 of the tray 1, the inner rib 76 of the tray 1, and the side wall 25, and it is held between the disk holding portion 9 and the front wall 25 confronting the disk holding portion 9 by means of the drive spring 31. The disk mounting portion 4 is composed of a mounting surface 42, and an arc form edge 43, and the mounting surface 42 is one step lowered by a slight angle toward the front side from the mounting surface 40, and a large disk 92 is supported by this mounting surface 40, edge 43, and groove 9a of the cartridge holding portion 9, while a small disk 93 is supported by a mounting surface 45 one step lower than the mounting surface 42. having a slightly larger angle than the mounting surface 42 toward the front side, and an arc form edge 46. That is, the mounting surfaces 42, 45 are inclined to be higher toward the inner side, which prevents the turntable from abutting against the disk when the tray 1 is transferred from the disk exchange position to the engagement position with the turntable 20.

Incidentally, by altering the shape of the cartridge between the face and the back and between the front and rear, it is effective to prevent insertion of cartridge in wrong direction in face and back, or front and rear when, mounting on the cartridge mounting portion 3. That is, bump or the like is formed in the portion of the cartridge mounting surface not duplicating with the mounting surface of the independent disk, and a relief recess is provided at the cartridge side so as to be mounted without being disturbed by the bump only when mounted at correct position. In FIG. 2, meanwhile, two cartridge guide pins 48 planted on the main chassis 10 are engaged with the alignment holes of the cartridge described later through hole 49 in the tray 1 so as to position. The guide pins 48 may be provided on the tray 1, alternatively.

In FIG. 2, reference numeral 55 is a metallic main body positioned at the bottom side of the housing 2 for fixing and holding the housing 2, and a printed circuit board 62 mounting circuit parts for recording and reproducing is provided in the main body 55. Reference numeral 56 is a motor provided in the housing 2 for conveying the tray 1, and it is slowed down by belt transmission means 57a and a reduction gear 57b, and rotates a pinion 57c. They mare mounted on shafts 63a to 63c. Reference numeral 58 is a rack, and a pawl (not shown) passing through its slit 64, and a pawl (not shown) engaged with the side of the rack 58 are provided at the back side of the tray 1, the rack 58 is slidably held on the back side of the tray 1, and one end of the rack 58 is stopped by a stopper (not shown) of the tray 1, while other end is defined by changeover means 59, so that sliding is defined. Accordingly, the rack 58 is engaged with the pinion 57c, and when the pinion 57c rotates, the rack 58 roves in the longitudinal direction Y1–Y2 together with the tray 1, thereby allowing to move between the disk exchange position and recording and reproducing position. The changeover means 59 has its shaft part 65 pivoted in the shaft hole in the back of the tray 1, and the side part of the rack 58 overlaps on the shaft part 65 to prevent the shaft part 65 from slipping out. The changeover means 59 has a protrusion 66 and a stopper 67 projecting in mutually opposite directions in the rotating direction about the shaft part 65, and the protrusion 66 projects outward of the side of the tray 1 to slide on the side surface of the housing 2, and in this state the stopper 67 is engaged with other end 73 of the rack 58, thereby defining the sliding of the rack 58. At the deepest sliding position of the tray 1 into the housing 2, that is, at the recording and reproducing position of the tray 1, the recess 68 and protrusion 66 formed at the inner side of the housing 2 confront each other, and the stopper 67 is pushed by the other end 73 of the rack 58 being moved by the rotation of the pinion 57c, and the changeover means 59 rotates so that the protrusion 66 may invade into the recess 68, and thereby the stopper 67 is separated from the rack 58, and the rack 58 is allowed to slide on the tray 1. Therefore, if the tray 1 is stopped, the rack 58 further moves deep into the housing 2, and at this time a protrusion 70 at the end of the main lever 11 is pushed by an operating piece 69 of the rack 58, and thereby the main lever 11 is rotated in the direction R1 about the shaft 16, and, as explained in FIG. 2, the main chassis 10 is rotated in direction U, and at the engaging position with the turntable, the turntable 20 is engaged with the disk 1, and the disk or the disk incorporated in the cartridge is lifted to the recording and reproducing position of disk, and the protrusion 70 invades into a groove 71 of the rack 58 by rotation.

When the motor 56 is rotated in reverse direction of above, the rack 58 and tray 1 operate reversely, and first sliding on the tray 1 until one end of the rack 58 hits against the stopper, the protrusion 70 engaged with the groove 71 at this time is pushed, and the main lever 11 is rotated in direction R2, thereby returning the main chassis 10 to the direction of arrow D. Next, at one end of the rack 58, by pushing the stopper of the tray 1 and moving the tray 1 in the direction of arrow Y2, the protrusion 66 rotates about the shaft 65, and the protrusion 66, being drawn from the side of the tray 1, slides on the inner side of the housing 2, and the stopper 67 is engaged with the other end 73 of the rack 58, thereby defining the sliding of the rack 58. By continuing the rotation of the motor 56 in the same direction, the tray 1 starts to move, discharges through the opening 15, and stops at the disk exchange position.

A clamper 60 provided in the lid 28 is thrust by a leaf spring 75 in a direction departing from the turntable 20, and this clamper 60 has a lever 74 projecting to the tray 1 side of the lid 28. The lid 28 is fitted to the housing 2 by mounting means such as stopping pawl, and therefore when the tray 1 is moved from the disk exchange position to the recording and reproducing position, the lever 74 is pushed by an operating piece 76 of the tray 1, and the clamper 60 resists the leaf spring 75 and rotates to push the disk onto the center cone of the turntable 20. On the other hand, when the tray 1 begins to move to the disk exchange position side, the operating piece 76 is separated from the lever, so that the clamper 60 is departed from the turntable. Incidentally, when a magnetic metal hub is provided at the disk side, and a magnet is provided at the turntable 20 side, in the case of the method of holding the disk by attracting the metal hub by this magnet, the clamper 60 is not needed, and therefore the necessary mechanism depending on the system may be individually provided.

The cover 61 has its side plate fixed to the side of the housing 2 by fixing means such as stopping pawl (not shown).

Meanwhile, the lid 28 is provided with an arm (not shown) for opening the protective lid of the cartridge, and the arm is thrust by a spring and positioned at a position for opening the protective lid, and in the process of the cartridge moving from the disk exchange position to the recording and reproducing position, the leading end of the arm is engaged with the edge of the protective lid, and along with move of the cartridge, the arm rotates by resisting the spring, thereby opening the lid.

Figure 3:
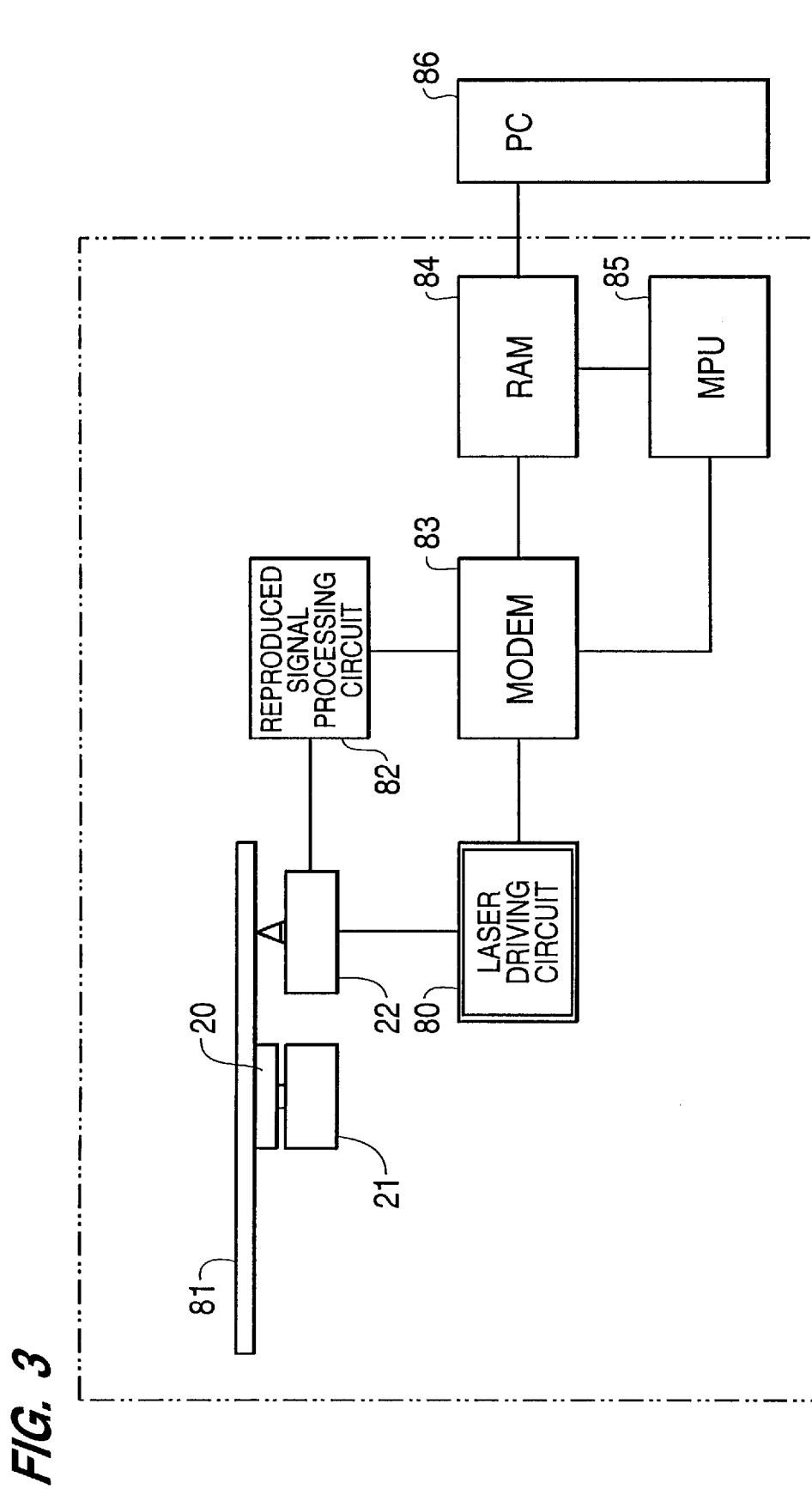
FIG. 3 is a block diagram of a drive system of the recording and reproducing apparatus of the embodiment of the invention.

FIG. 3 shows a block diagram of a disk drive circuit of an optical disk 81, and it is provided in the main chassis 10 and printed circuit board 62. That is, a laser drive circuit 80 operates, and the laser is emitted to the optical disk 81 through the pickup 22, a reproduction signal from the optical disk 81 is received by a sensor unit of the pickup 22, and it is processed in a reproduction signal processing circuit 82 and demodulated in a modem circuit 83, and stored in a RAM 84. A central processing unit MPU 85 controls them, and exchanges data with an external personal computer PC 86.

Figure 4:
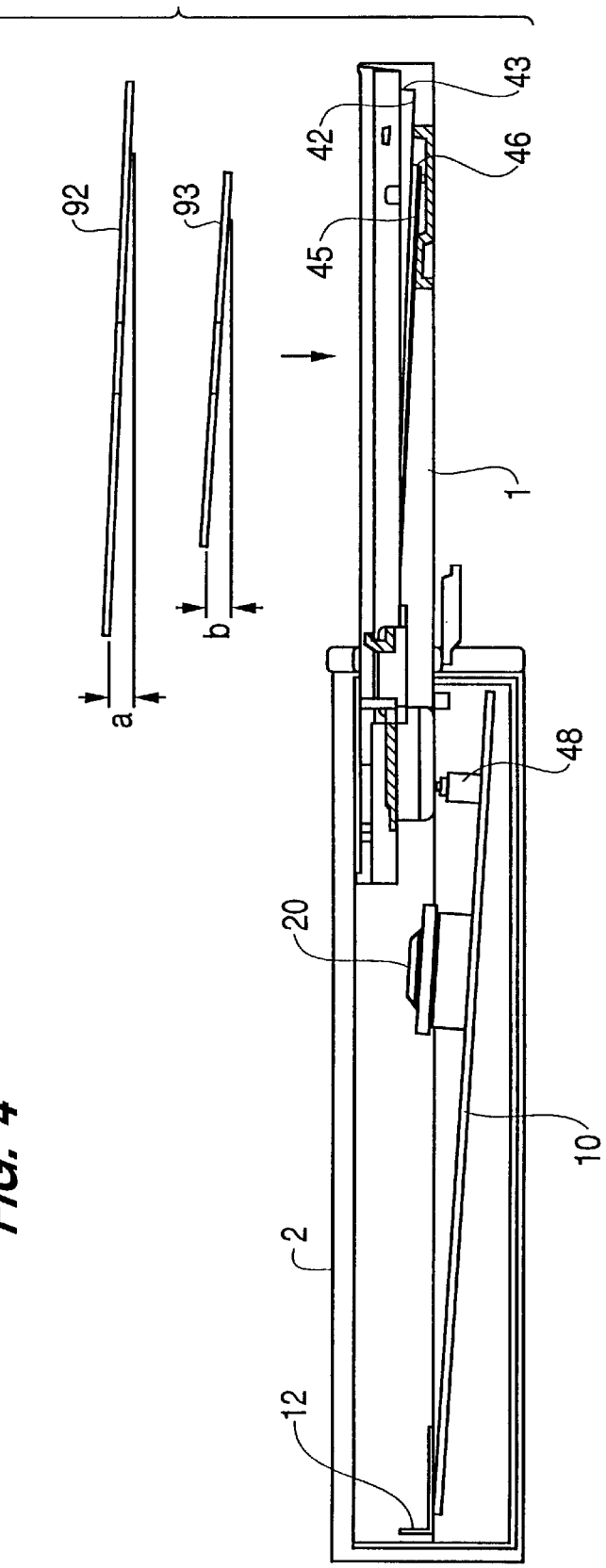
FIG. 4 is an explanatory diagram showing mounting of disk and cartridge on a tray in the first embodiment of the invention.
Figure 5A:
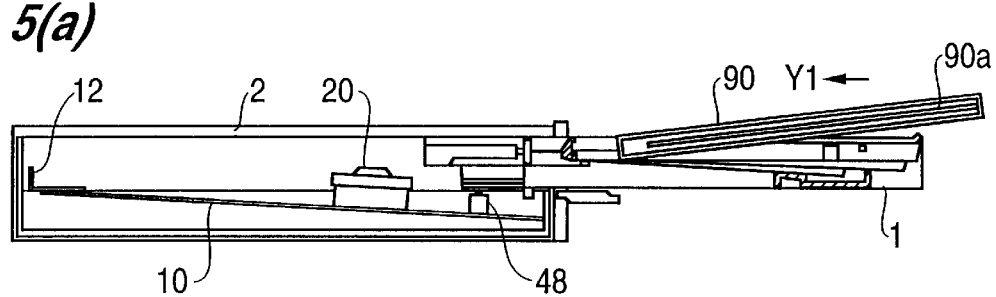
FIG. 5 is an explanatory diagram of loading and recording and reproducing operation by mounting a cartridge on a tray in horizontal position or vertical position in the first embodiment of the invention.
Figure 5B:
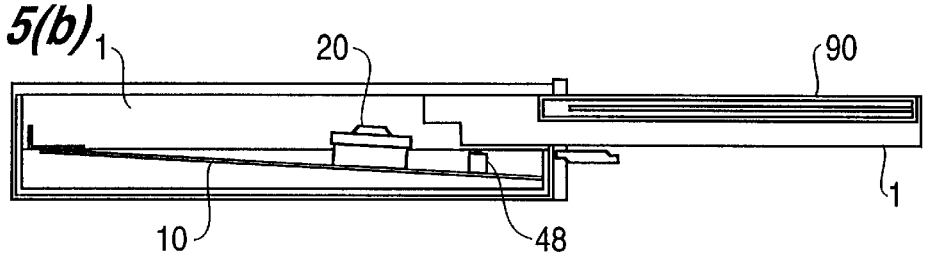
Figure 5C:
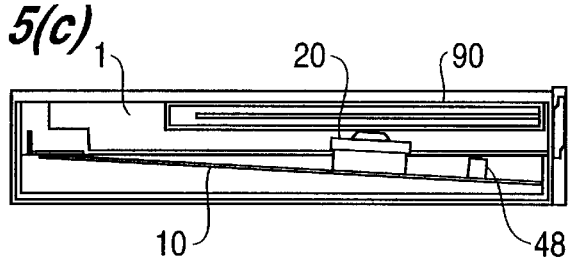
Figure 5D:
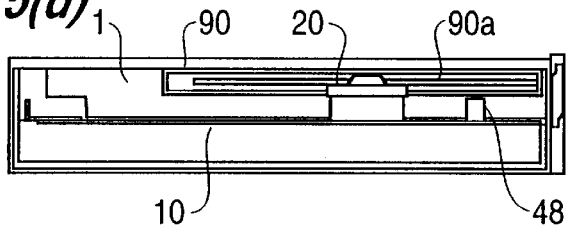
Figure 6A:
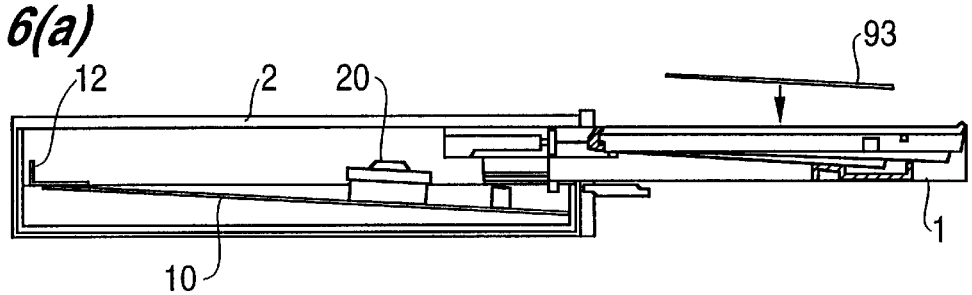
FIG. 6 is an explanatory diagram of loading and recording and reproducing operation by mounting a small disk on a tray in horizontal position in the first embodiment of the invention.
Figure 6B:
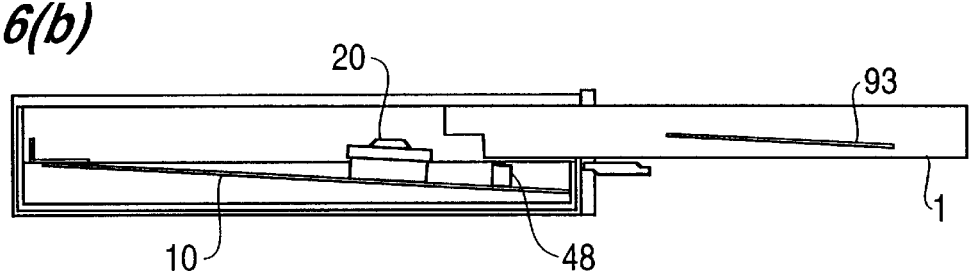
Figure 6C:
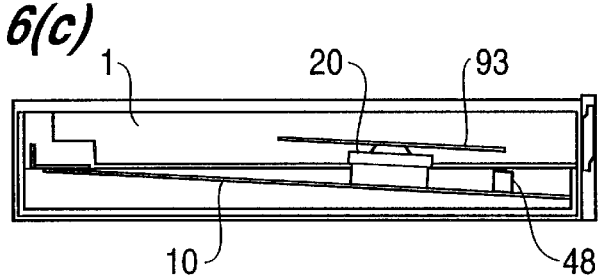
Figure 6D:
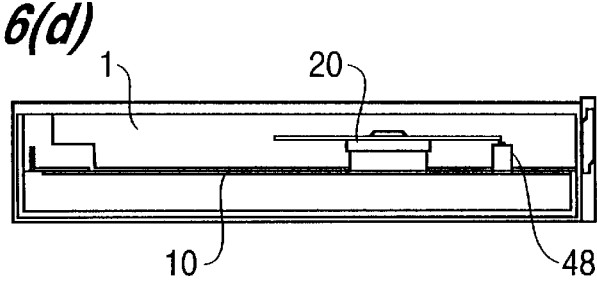
Figure 7A:
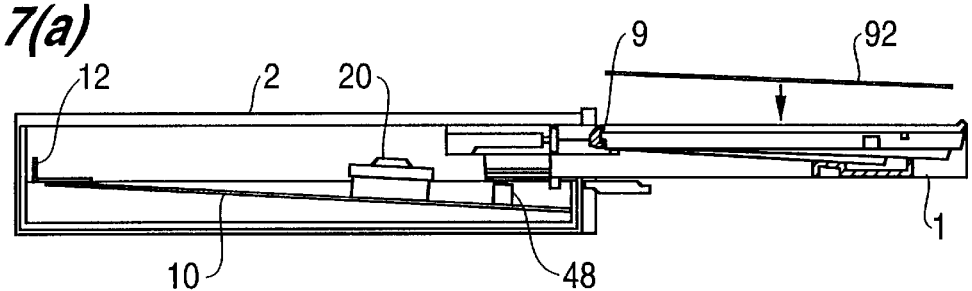
FIG. 7 is an explanatory diagram of loading and recording and reproducing operation by mounting a large disk on a tray in horizontal position in the first embodiment of the invention.
Figure 7B:
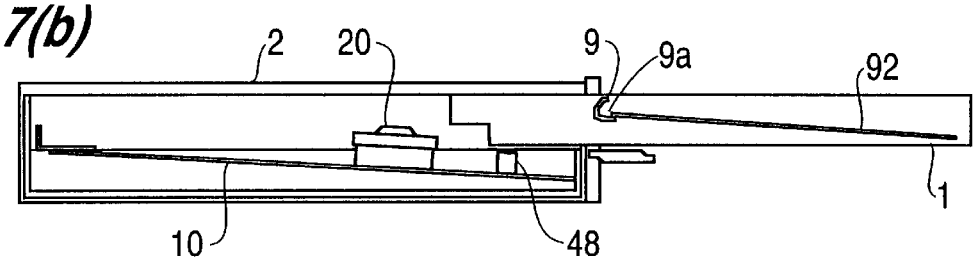
Figure 7C:
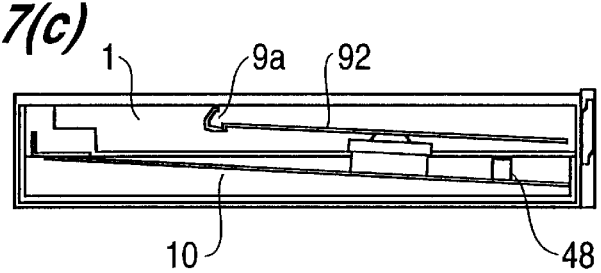
Figure 7D:
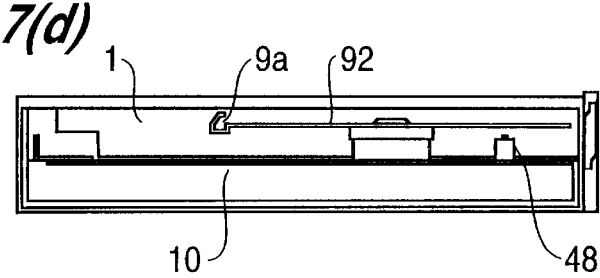
Figure 8A:
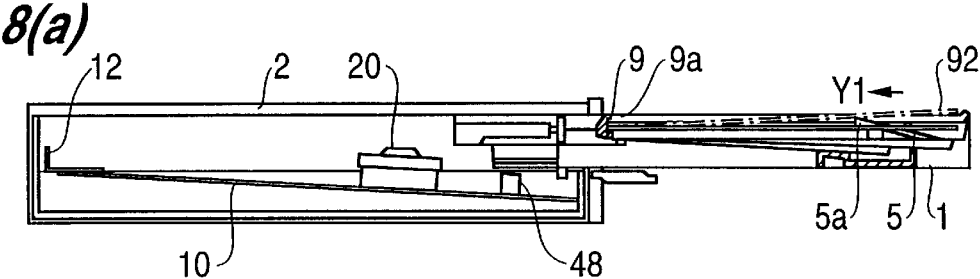
FIG. 8 is an explanatory diagram of loading and recording and reproducing operation by mounting a large disk on a tray in horizontal position or vertical position in the first embodiment of the invention.
Figure 8B:
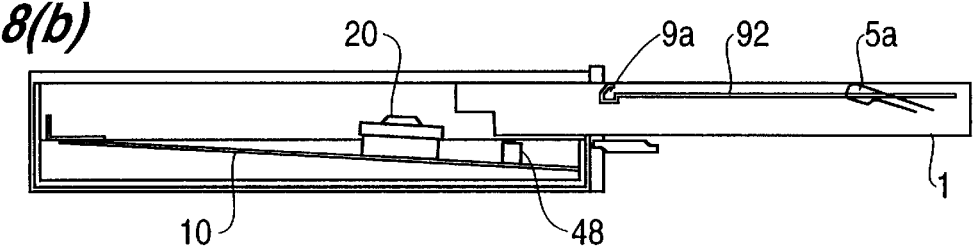
Figure 8C:
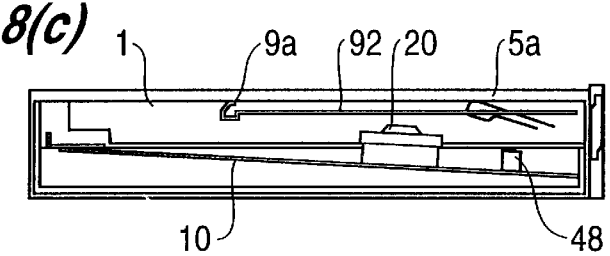
Figure 8D:
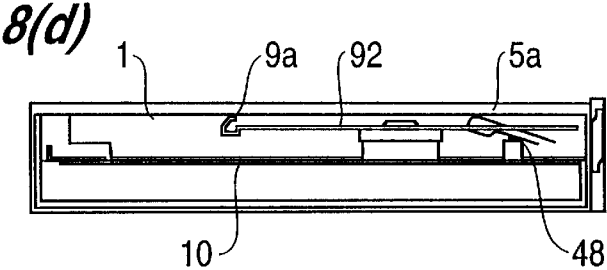
Figure 9A:
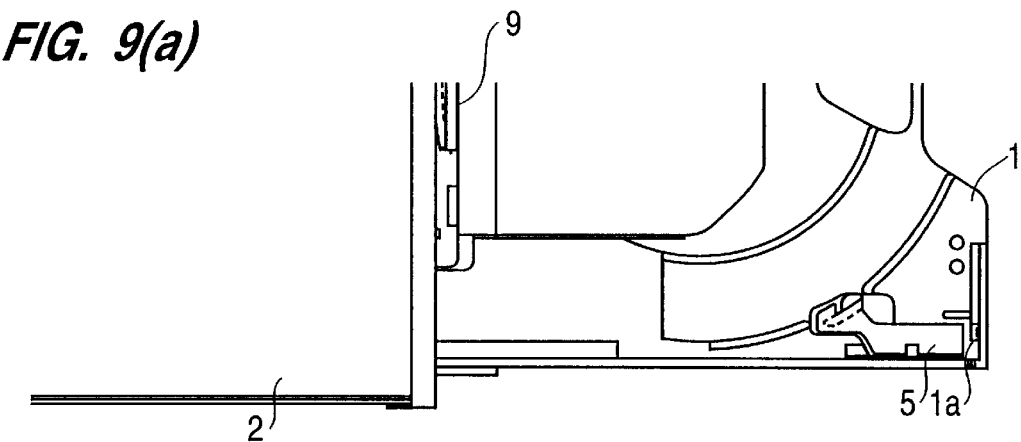
FIG. 9 shows a mounting state of cartridge, with the disk engaging portion sinking, on a tray in horizontal position or vertical position in the first embodiment of the invention, (a) being a plan view in horizontal position, and (b) to (d) sectional views showing the mounting procedure.
Figure 9B:
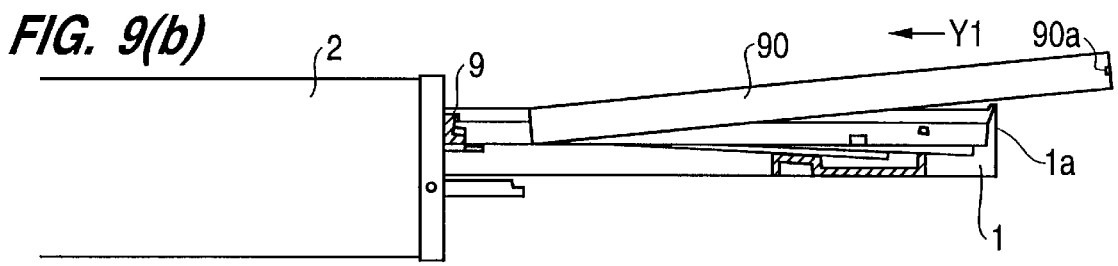
Figure 9C:
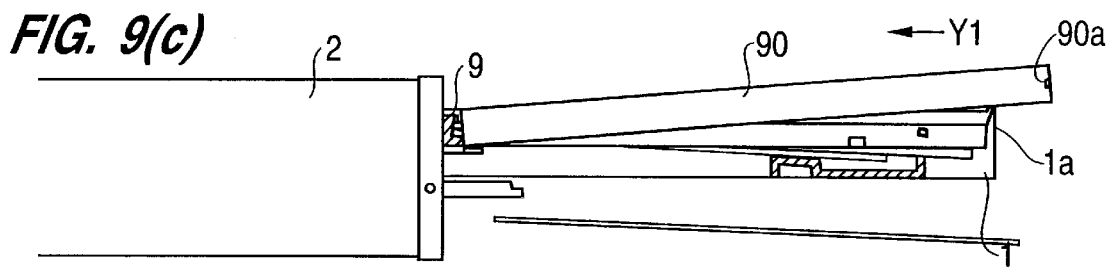
Figure 9D:
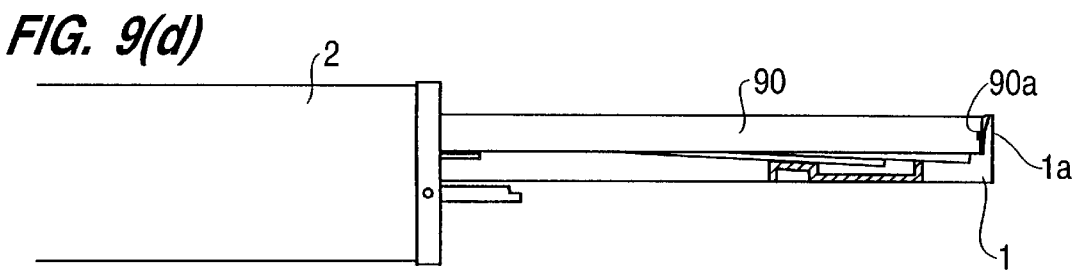
Figure 10A:
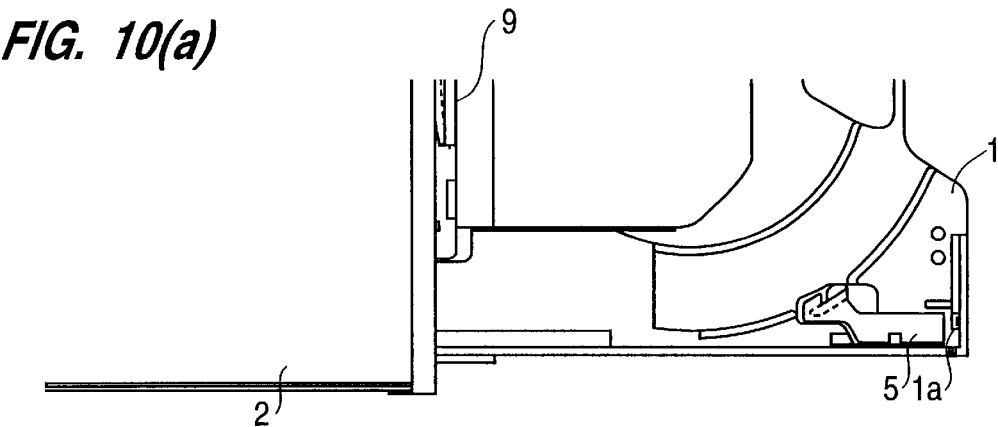
FIG. 10 shows a mounting state of cartridge, with the disk engaging portion projecting, on a tray in horizontal position or vertical position in the first embodiment of the invention, (a) being a plan view in horizontal position, and (b) to (d) sectional views showing the mounting procedure.
Figure 10B:
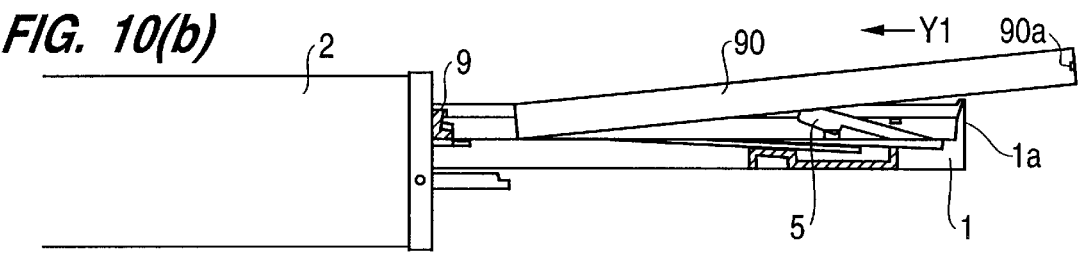
Figure 10C:
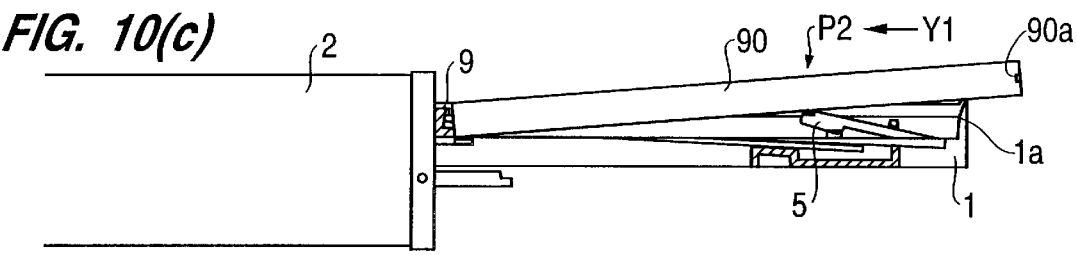
Figure 10D:
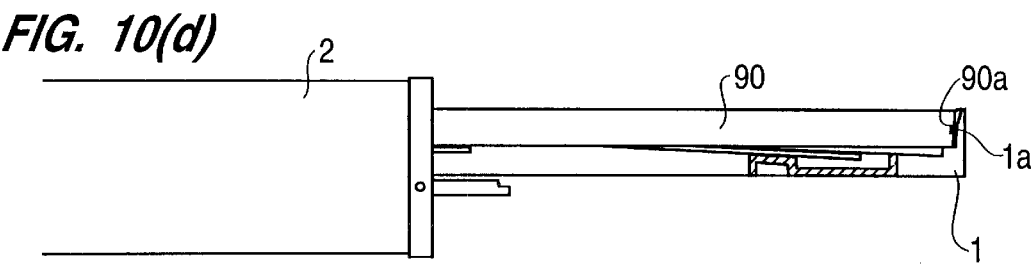

FIG. 4 shows a loading operation of disk and cartridge in horizontal position of the tray 1. FIG. 4 shows to mount any one of a cartridge 90 and disks 92, 93 differing in size on the tray 1, and the mounting surface 42 of the large disk 92 on the horizontal surface of the tray 1 is a°, and the mounting surface 45 of the small disk 93 is inclined by b° (a°>b°), thereby avoiding interference with the turntable 20 which approaches when mounting the disk on the recording and reproducing position. The cartridge 90 is held in the cartridge mounting portion 3 as shown in FIG. 1 and FIG. 2. That is, the cartridge 90 is mounted on the mounting surface 40 in FIG. 2, and positioned on the walls 25 at the front side and both sides of the tray 1 and rib 76, and is pinched and held by the cartridge holding portion 9 that is thrust by the drive spring 31. The large disk 92 is positioned by the mounting surface 42, edge 43, and groove 9a of the cartridge holding portion 9. The small disk 93 is positioned by the mounting surface 45 and edge 46.

FIG. 5 shows the operation of the cartridge 90 from the disk exchange position to the recording and reproducing position in the horizontal position and vertical position of the tray 1. FIG. 5 (a) shows the mounting method of the cartridge 90.

In FIG. 5 (b), the operation of the parts for transferring the cartridge 90 is done sequentially by computer control. When an eject/load switch 94 (FIG. 2) on the front surface of the housing 2 is pressed, as explained in FIG. 2, the tray 1 is discharged to the disk exchange position at the position in FIG. 5 (a) from the opening 15. The cartridge 90 is put on this tray 1 in the direction of Y1. When loading the tray 1, by pressing the eject/load switch 94 provided on the front surface of the housing 2, the tray 1 begins to move from the opening 15 to the inside of the housing 2 by rotation of the motor 56 (FIG. 2) as driving means. In the moving process of the tray 1, the arm (not shown) for opening the protective lid of the cartridge 90 explained in FIG. 2 is engaged with the opening portion of the protective lid, and as the cartridge 90 moves to the recording and reproducing position, the arm rotates and the protective lid is opened completely.

FIG. 5 (c) is a state of the tray 1 transferred to the recording and reproducing position.

FIG. 5 (d) is the state of putting the disk 90a on the turntable 20 by rotation of the main chassis 10. That is, at the stopped position of the tray 1, by the action of the changeover piece 59 of the drive mechanism shown in FIG. 2, the rack 58 slides on the tray 1, and the main lever 11 is driven in the direction of arrow R1 by the action of the rack 58, and the main chassis 10 is pushed up nearly to the horizontal position by resisting the spring force of the torsion leaf 12, and the cartridge guide pin 48 is engaged with the alignment hole, not shown, provided in the bottom of the cartridge 90 to guarantee the height of the cartridge 90 relative to the main chassis 10, thereby keeping the clearance, including the runout during rotation between the cartridge 90 and the internal disk 90a. When mounting of the cartridge 90 on the turntable 20 is over, the disk motor 21 rotates, and the pickup 22 moves to specified position by rotation of the motor 78 (FIG. 2) of the transfer mechanism, thereby recording and reproducing.

FIG. 6 shows the case of mounting the small disk 93 on the tray 1 in the horizontal position of the tray, and FIG. 7 is the case of mounting the large disk 92 on the tray 1. In either case, as shown in (a) of each drawing, when the eject/load switch 94 is pressed by putting the disks 92,93 on specified position of the tray 1, the operation from the position of (b) to (c) and (d) of each drawing is conducted as explained in FIG. 5.

The height of the disks 92, 93 is a problem, but as mentioned above since the mounting surface 42 of the large disk 92 is inclined by a° to the horizontal plane of the tray 1, and the mounting surface 45 of the small disk 93 by b°, and therefore the disks 92 and 93 will not contact with the turntable 20 in the process of transfer to the recording and reproducing position. Moreover, by the turntable 20, the disk 92 is kept at a higher position than the mounting surface 42, and the disk 92 will not contact with the mounting surface 42. Similarly, the disk 93 mounted on the lower mounting surface 45 is kept flush with the disk 92, so that it will not contact with the mounting surface 45.

After recording or reproducing, when discharging the cartridge 90 and disks 92, 93, by pressing the eject/load switch 94, in the completely reverse procedure of mounting of disks 92, 93, etc. as explained in FIG. 2, first the main chassis 10 descends, and the tray 1 is discharged. At this time, the height of the cartridge 90 is not changed, but the disks 92, 93 are lowered to the original mounting place of the tray 1.

FIG. 8 shows the case of mounting the large disk 92 on the tray 1 in the vertical position of the tray 1. FIG. 8 (a) shows a method of mounting on the groove 5a of the disk engaging portion 5 while pushing the disk holding portion 9 described below in the direction of arrow Y1 by the large disk 92.

As shown in FIG. 8 (b), the disk 92 held between the groove it 9a of the disk holding portion 9 and the groove 5a of the disk engaging portion 5 is not dropped out of the tray 1 even in vertical position, and by pressing the eject/load switch 94, the action of FIG. 8 (c), (d) is conducted as explained in FIG. 6 and FIG. 7.

As shown in FIG. 8 (d), between the disk 92 and the groove 9a of the disk holding portion 9 and the groove 5a of the disk engaging portion 5, a free space is predetermined and kept so as not to contact with the disk 92 due to eccentricity or runout when the disk 92 is rotated by the turntable 20.

When discharging the disk 92 after recording or reproducing, by pressing the eject/load switch 94, in the completely reverse procedure of mounting of disks 92, 93, etc. as explained in FIG. 2, first the main chassis 10 descends., then the tray 1 is discharged. By pressing the disk holding portion in the direction of arrow Y1 with the disk 92 held in the tray l, the disk 92 is dismounted from the tray 1.

The mounting method of cartridge 90, large disk 92, and small disk 93 on the tray 1 in the horizontal position and vertical position of the tray 1 is described in detail below.

FIG. 9 shows the case of mounting the cartridge 90 while the disk engaging portion 5 is at a sinking position than the mounting surface 40 of the cartridge 90 as shown in FIG. 14 (c). When the cartridge 90 is mounted in the direction of arrow Y1 from FIG. 9 (b) to FIG. 9 (c), the leading end of the cartridge 90 abuts against the disk holding portion 9. As shown in FIG. 9 (d), when the cartridge 90 is inserted into the recording and reproducing apparatus by resisting the thrusting force of the drive spring 31, the disk holding portion 9 is moved into the recording and reproducing apparatus by the cartridge 90, and the recess 90a before the cartridge 90 is engaged with the bump 1a of the tray 1. By the gripping force of the disk holding portion 9 by the thrusting force of the drive spring 31, the cartridge 90 is held, so that the tray 1 may be commonly usable in horizontal position and vertical position. At this time, the disk engaging portion 5 is at a sinking position from the mounting surface 40 of the cartridge 90 as shown in FIG. 14 (c).

FIG. 10 shows the case of mounting the cartridge 90 when the disk engaging portion 5 is at a projecting position from the mounting surface 40 of the cartridge 90 as shown in FIG. 14 (a). When the cartridge 90 is mounted in the direction of arrow Y1 from FIG. 10 (b) to (c), the disk engaging portion 5 is turned in the direction of arrow P2 as shown in FIG. 14 (b) by the mounting surface of the cartridge 90, and the disk engaging portion 5 is put into the tray 1 in the state in FIG. 10 (d). The other operation is the same as in FIG. 9. Such loading procedure of the cartridge 90 is the same as in the procedure without disk engaging portion 5, and it is known to be excellent in controllability. When taking out the cartridge 90, the procedure is reverse by using a notch 7, but the both disk engaging portions 5 project by the action of a pressure spring 32. Therefore, immediately after removing the cartridge 90, the disk 92 can be mounted on the tray 1.

Figure 11A:
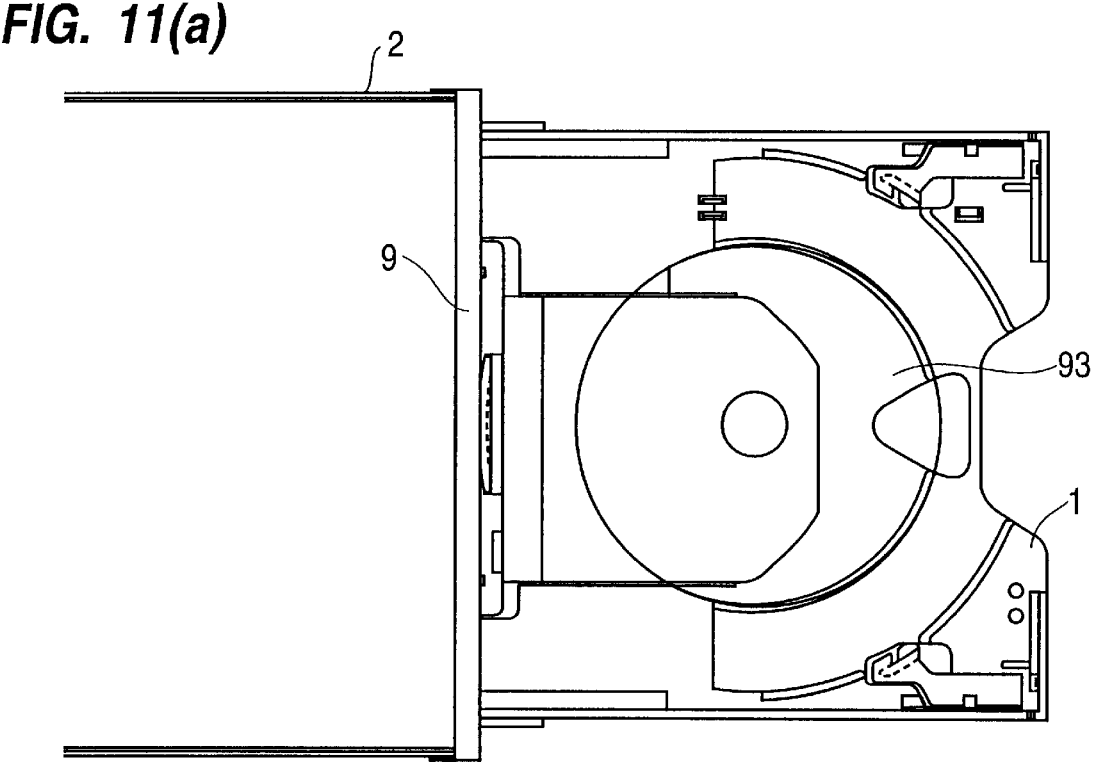
FIG. 11 shows a mounting state of small disk, with the disk engaging portion sinking, on a tray in horizontal position in the first embodiment of the invention, (a) being a plan view, and (b) and (c) sectional views showing the mounting procedure.
Figure 11B:
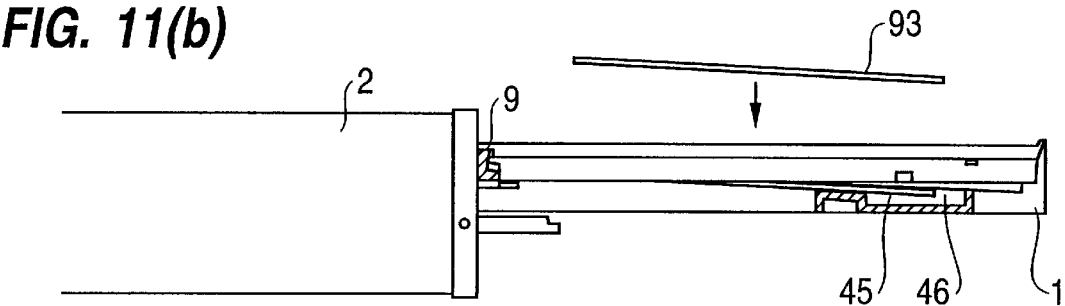
Figure 11C:
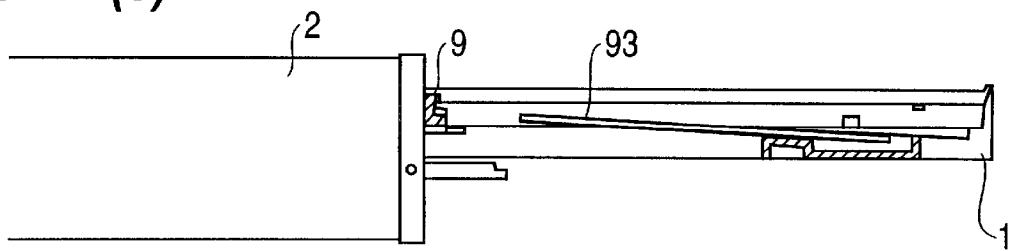

FIG. 11 shows the case of mounting the small disk 93 on the tray 1 in horizontal position. Since the disk 93 and disk engaging portion 5 are cleared, the state of the disk engaging portion is not related. The disk 93 is held by the mounting surface 45 and edge 46.

Figure 12A:
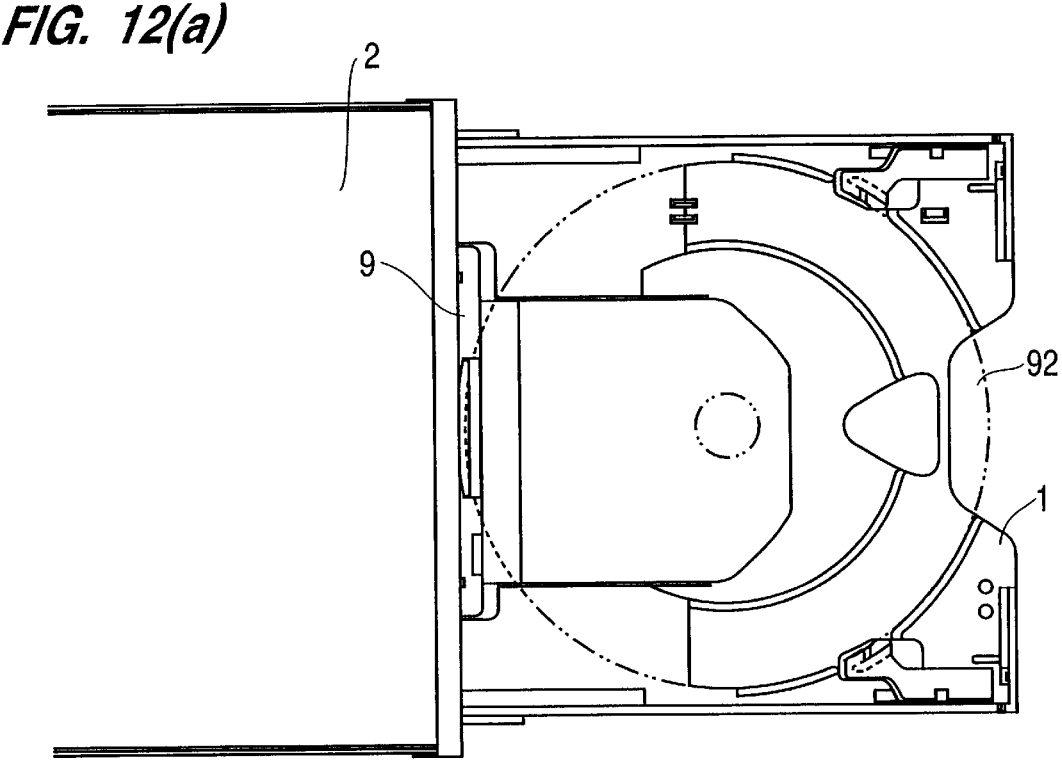
FIG. 12 shows a mounting state of large disk, with the disk engaging portion sinking, on a tray in horizontal position in the first embodiment of the invention, (a) being a plan view, and (b) and (c) sectional views showing the mounting procedure.
Figure 12B:
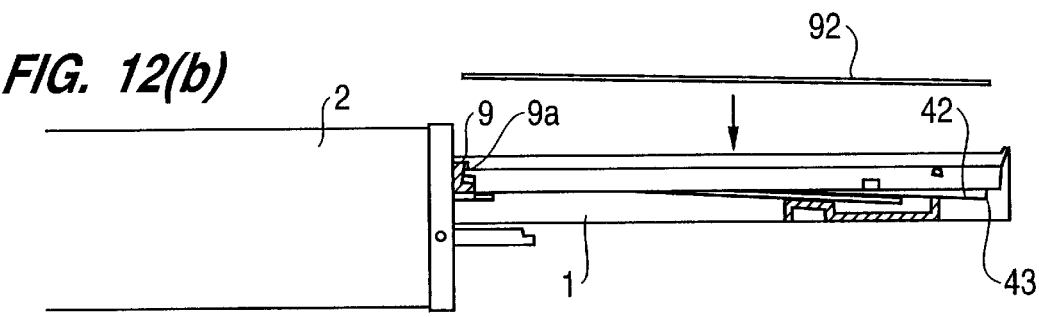
Figure 12C:
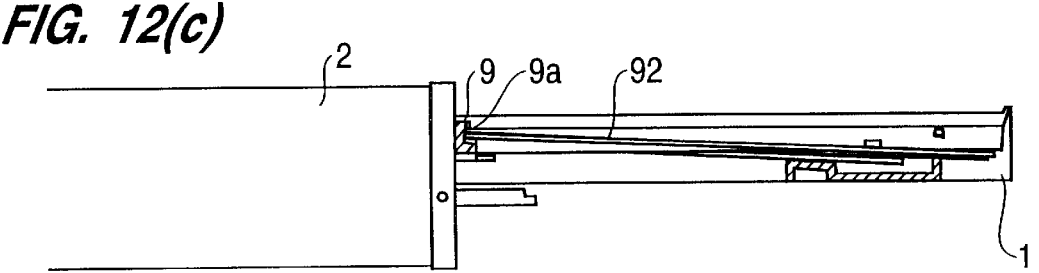

FIG. 12 shows the case of mounting the disk 92 on the tray 1 of horizontal position, with the disk engaging portion 5 at lower position than the mounting surface 42 of the large disk 92 as shown in FIG. 14 (c). The disk 92 is held by the mounting surface 42, edge 43, and groove 9a of the disk holding portion 9. Therefore, when the disk engaging portion 5 is in sinking state, in the case of using the tray 1 in the horizontal position, same as in the state completely free from disk engaging portion 5, the disk 92 or cartridge 90 may be selectively mounted on the tray 1.

Figure 13A:
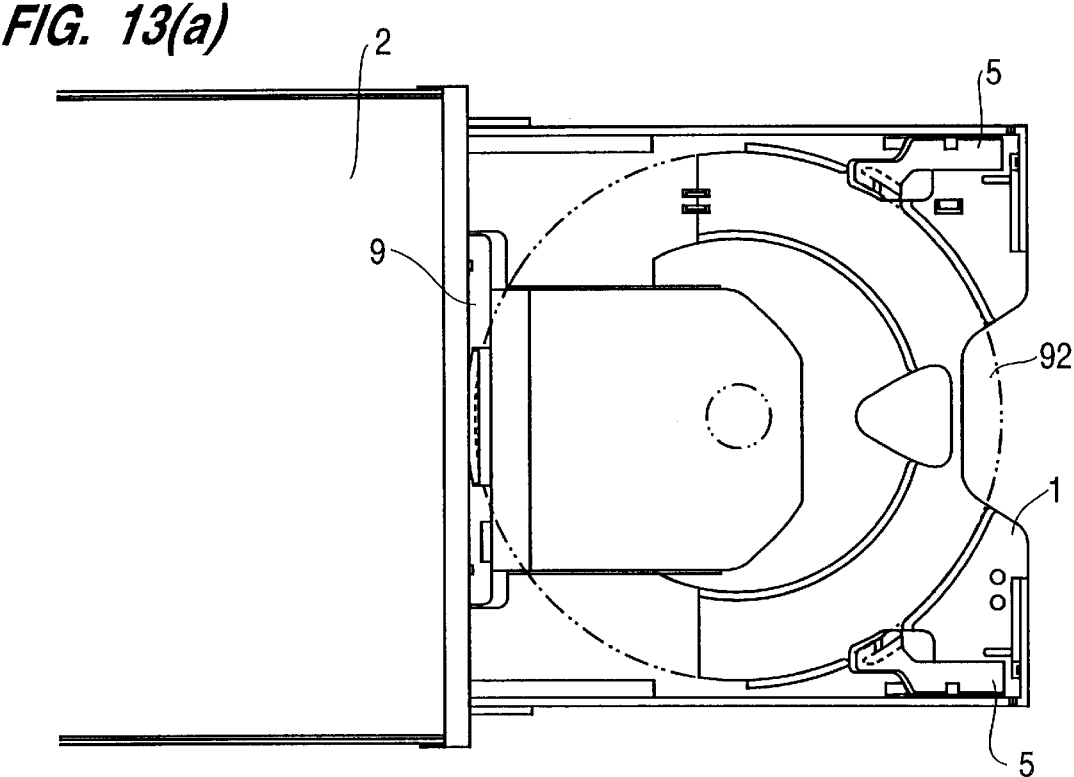
FIG. 13 shows a mounting state of large disk, with the disk engaging portion projecting, on a tray in horizontal position or vertical position in the first embodiment of the invention, (a) being a plan view in horizontal position, and (b) and (c)) sectional views showing the mounting procedure.
Figure 13B:
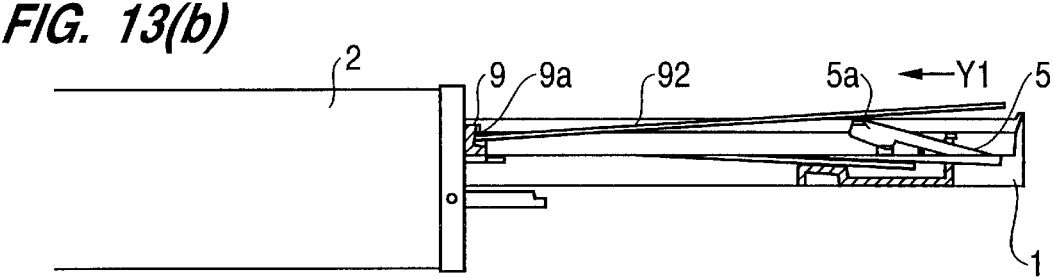
Figure 13C:
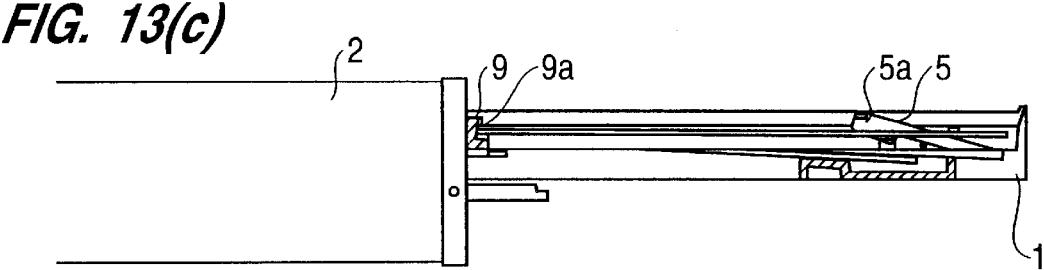

FIG. 13 shows the case of mounting the disk 92 on the tray 1 in vertical position. In this case, as shown in FIG. 14 (a), by projecting the disk engaging portion 5, the disk 92 is inserted into the groove 5a of the disk engaging portion 5 while pushing the groove 9a of the disk holding portion 9 in the direction of arrow Y1 by the disk 92 as shown in FIG. 13 (b). In particular, the disk engaging portion 5 at the lower side in FIG. 13 (a) supports the weight of the disk 92 from beneath, and it is arranged so that the center of gravity of the disk may be located between it and the disk holding portion 9, the disk 92 held between the groove 9a of the disk holding portion 9 and the groove 5a of the disk engaging portion 5 is not dropped out of the tray 1 even in vertical position, and the peripheral edge of the disk 92 is stopped. The peripheral edge of the disk 92 is supported in an inclined state by the groove 5a of one or two disk engaging portions 5, groove 9a of disk holding portion 9, and edge 43 of the mounting surface 42 of the tray 1 as shown in FIG. 13 (a). This inclination of the disk 92 is determined in the dimensional relation so that the disk 92 may settle within the tray 1, that is, the upper end side of the peripheral edge of the disk 92 may not project outward of the wall 25. Moreover, when the center of the disk 92 is held by the turntable 20, the disk holding portion 9 and disk engaging portion 5 are arranged so that there may be a slight clearance against both the groove 9a of the disk holding portion 9a and the groove 5a of the disk engaging portion 5. That is, in the vertical position of the tray, when the disk is held between the groove 9a of the disk holding portion 9 and the groove 5a of the disk engaging portion 5, the center of the disk 92 is deviated from the center of the turntable due to gravity, but as far as the deviation of the turntable 20 is slight, there is no problem because the prior art for adjusting the disk 92 to the center of the turntable 20 is available.

In this state, when the tray 1 is conveyed to the recording and reproducing position in the housing 2, as explained in FIG. 2 and others; the main chassis 10 rotates, and the turntable 20 invades into the center of the disk 92 through the hole 6 in the tray 1, and simultaneously the clamper 60 pushes the disk 92 onto the turntable 20, so that recording or reproducing may be enabled same as in the case of horizontal position of the tray 1. At this time, of course, the peripheral edge of the disk 92 is kept at a specific clearance from the disk engaging portion 5 and disk holding portion 9, and the dimensional relation is set by the adjustment of the position of main chassis 10 in recording and reproducing so as not to impede rotation of the disk 92. When transferring the tray 1 to the disk exchange position after finishing recording or reproducing, it is the same state as shown in FIG. 13 (c).

Recording and reproducing is performed by moving tray 1 to the position for recording and reproducing from the state shown in FIG. 13 (c) and rotating the disk 92 by pushing the turntable 20 with the cramper 60. When discharging the disk 92, the disk 92 is never dropped out of the tray 1, if the disk 92 is returned to the state shown in FIG. 13 (c) by the reverse procedure described above and the tray is discharged.

Incidentally, it is evident that there is no problem in operation if the tray 1 is set in horizontal position in the state in FIG. 13.

According to the first embodiment, since the tray 1 possesses the disk engaging portion 5 which is the second disk engaging portion for detachably supporting the peripheral edge of the disk 92 at the side surface for supporting the disk 92 at least when the tray 1 is in vertical position, and possesses the cartridge mounting portion 3 for detachably holding the cartridge 90 incorporating the disk 90a at the side surface, when loading the disk 92, by pinching the disk 92 between the disk holding portion 9 which is the first disk engaging portion and the disk engaging portion 5 which is the second disk holding portion, the disk 92 does not fall down from the tray 1 in vertical position, and moreover the cartridge 90 is held between the disk holding portion 9 which is the first disk engaging portion and the cartridge mounting portion 3, and the disk engaging portion 5 sinks into the holding surface, so that the disk 92 and cartridge 90 may be mounted selectively.

Still more, since the disk engaging portion 5 is provided so as to be free to move in and out of the cartridge mounting portion 3, the disk can be held by making use of the space of the cartridge mounting portion 3 without exerting effects on mounting of cartridge 90.

As the disk engaging portion 5 is thrust in the projecting direction, by mounting the cartridge 90 on the cartridge mounting portion 3, the disk engaging portion 5 sinks into the tray 1, and the disk engaging portion 5 projects by unloading the cartridge 90, so that the inserting and removing operation of the disk engaging portion 5 is not necessary.

Moreover, the tray 1 possesses the disk mounting portion 4 for positioning and mounting the disk 92 in its horizontal position, and therefore the recording and reproducing apparatus can be installed so that the tray 1 may be in horizontal position or vertical position, and thereby the method of installation of the recording and reproducing apparatus is more flexible.

Incidentally, the disk mounting portion 4 which is the disk holding surface is inclined from the horizontal plane so that the inner side may be higher in the disk mounting portion for positioning and mounting the disk when the tray 1 is in horizontal position, so that it is effective to prevent the disk from abutting against the turntable when the moving the tray from the disk exchange position to the recording and reproducing position of disk.

The disk engaging portion 5 may be added to the upper side of the tray 1, line symmetrically to the disk engaging portion 5 at the lower side of the center of the tray 1. As a result, the side surface for mounting the disk 92 of the tray 1 may be preferably set at the right side or left side of the tray, and it is easier to use., When the disk engaging portion 5 is disposed outside of the disk mounting portion 4, the disk engaging portion 5 does not interfere when loading or unloading the disk, and it is easier to use.

The disk engaging portion 5 may be also modified to be detachably fitted to the cartridge mounting portion 3, and the disk engaging portion 5 may be also modified to be selectively changed over to the projecting position and sinking position, so that the structure may be altered depending on the purpose and may be constituted to be easy to use.

A second embodiment of the invention is described below while referring to FIG. 15 through FIG. 17. That is, this recording and reproducing apparatus comprises, in addition to the first embodiment, position specifying means 140 for issuing a signal showing either horizontal position or vertical position of the tray 1, and driving means 141 driven by the signal to project the disk engaging portion 5 when the tray 1 is in vertical position, and sinking when the tray 1 is in horizontal position. The other constitution is same as in the first embodiment.

Figure 15A:
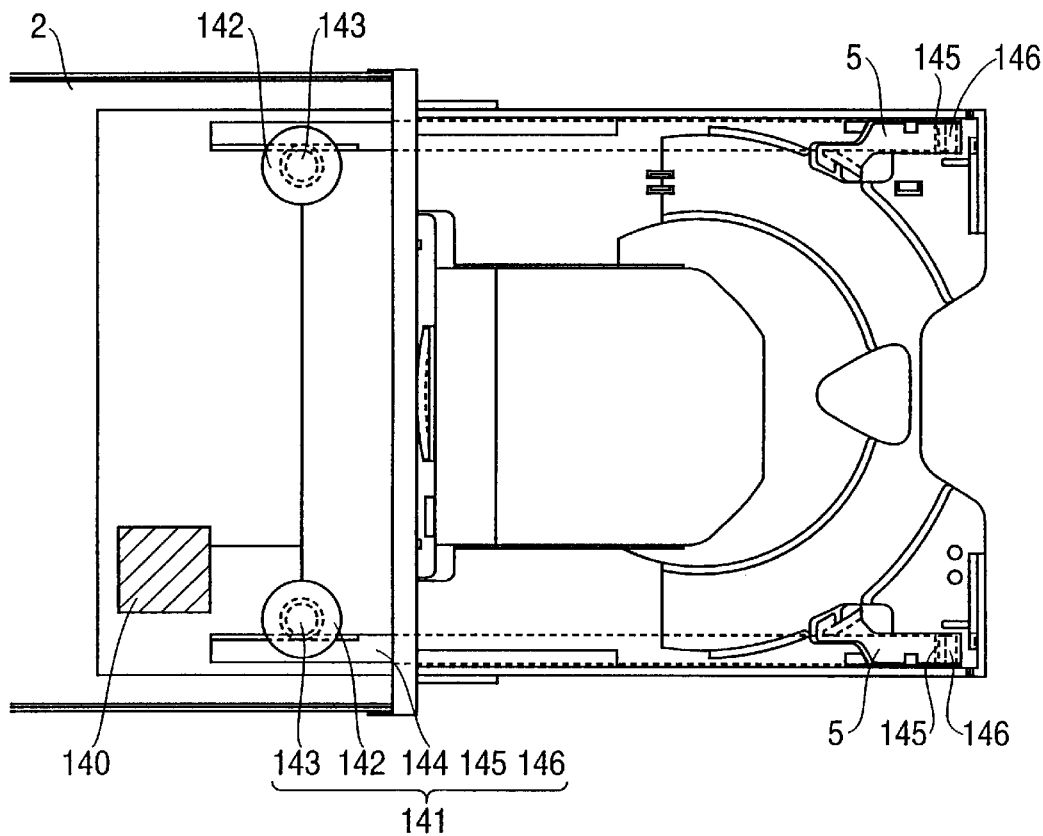
FIG. 15 shows a state of a tray in vertical position in a second embodiment of the invention, (a) being a side view and (b) its cross sectional view.
Figure 15B:
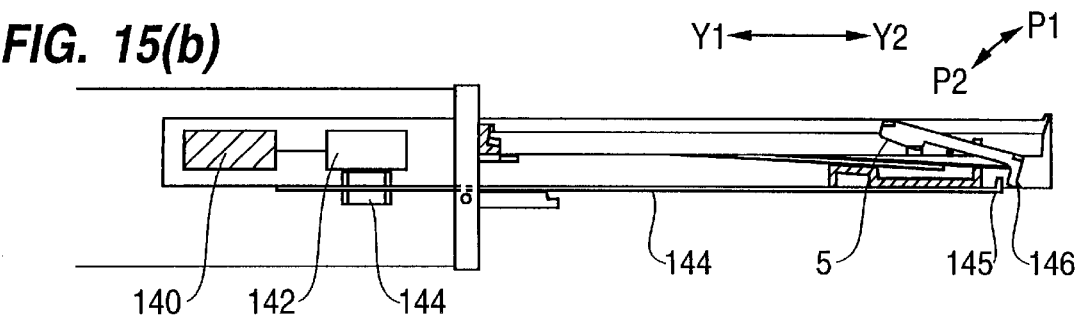

In FIG. 15, the driving means 141 comprises a motor 142 which rotates normally or reversely depending on the signal of the position specifying means 140, a pinion 143 cooperating with the motor 142, and a rack lever 144 which is engaged with the pinion 143, and a rib 145 extending in a direction at right angle to the moving direction positioned near the disk engaging portion 5 is formed in the rack lever 144. In the disk engaging portion 5, on the other hand, there is a protrusion 146 extending in the radial direction from the center of rotation, with the leading end freely abutting against the rib 145. When the tray 1 is in horizontal position, a signal for rotating the motor 142 reversely is issued, and in vertical position, a signal for rotating the motor 142 normally is issued.

The position specifying means 140 in this embodiment is a detection sensor for detecting the drive installation direction.

FIG. 15 refers to the case of vertical position of the tray 1, in which the position specifying means 140 issues a signal for rotating the motor 142 normally, and the motor 142 of the driving means 141 rotates normally to rotate the pinion 143, and the rack lever 144 moves in the direction of arrow Y1. Accordingly, the protrusion 146 abutting against the rib 145 is released, and the disk engaging portion 5 thrust by the pressure spring 32 is rotated in the direction of P1 by the thrusting force, and, as shown in FIG. 14 (a), the disk engaging portion 5 is set in projecting position and projects onto the mounting surface 42. Hence, the disk 92 can be supported on the tray 1 by the disk engaging portion 5. On the other hand, the disk engaging portion 5 can be pushed in and sink into the tray 1, and there is no obstacle for mounting the cartridge 90.

FIG. 16 shows the detection sensor for detecting the drive installation direction, with the position specifying means 140 mounted on the tray 1. FIG. 16 (a) is a side view of installation state of the housing in which the tray 1 of the recording and reproducing apparatus is horizontal, and (b) is its front view. FIG. 16 (c) shows the structure of the position specifying means 140, and a slope of which center is at the lowest position is formed in the bottom of an internal space 150, a pair of terminals 151 are provided in the bottom at an interval, and a steel ball 152 is put in the bottom. The steel ball 152 is located at the lowest position of the slope by the gravity, and at this time the steel ball 152 contacts with both of the pair of terminals 151 to short circuit the terminals 151. Between the terminals 151, as shown in FIG. 16 (c), when a power supply 153 and a detection lamp 154 are connected in series, the detection lamp 154 lights up. At the same time, by this switch, a reverse rotation signal of the motor can be picked up by using known means. FIG. 16 (d) and (e) are side view and front view of vertical position of the recording and reproducing apparatus, and at this time the steel ball 152 moves to the lowest position in the state departed from the terminals 151 as shown in (f), and thereby the terminals 151 are opened and the detection lamp 154 goes out. The detection sensor may not be limited to the shown example, but may be of different type. Besides, by turning off the switch, a normal rotation signal of motor can be picked up by using known means.

Figure 17A:
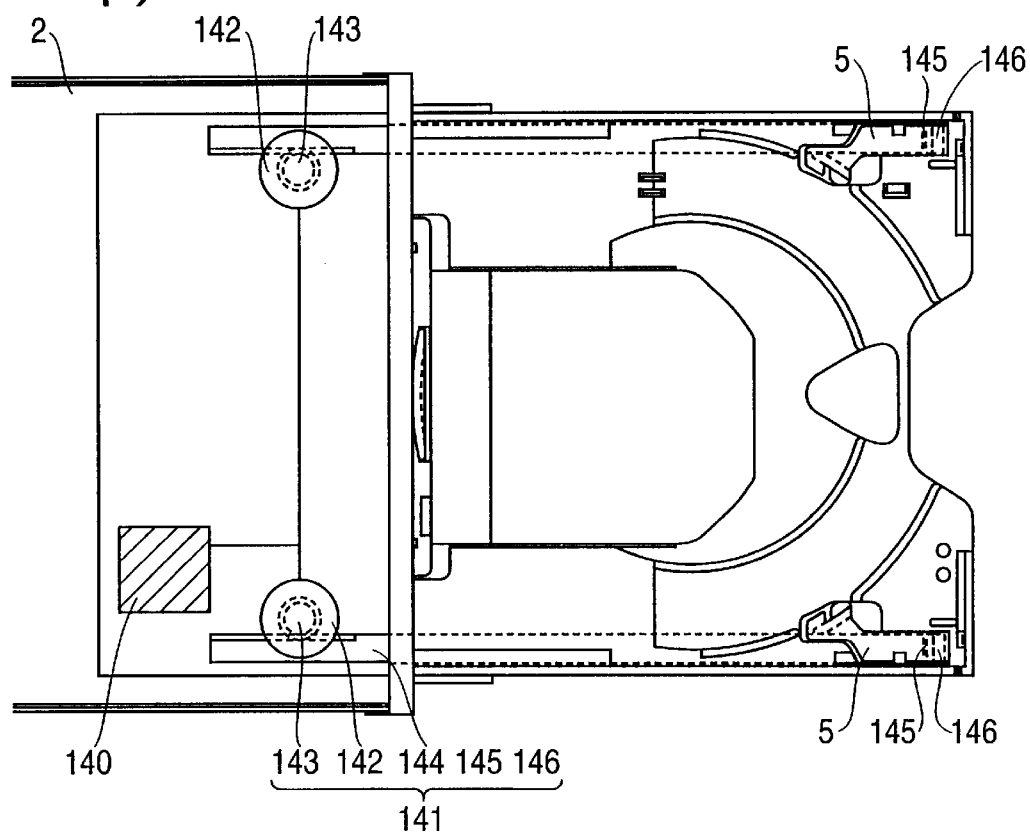
FIG. 17 shows a state of horizontal position of the tray in the second embodiment of the invention, (a) being its plan view and (b) a cross sectional view.
Figure 17B:
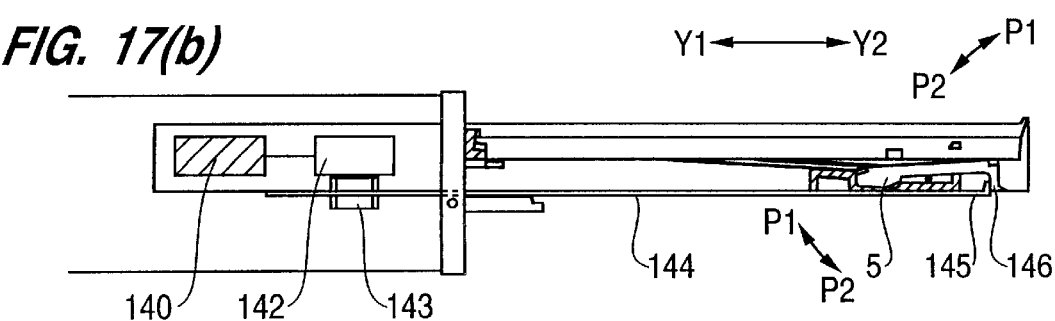

FIG. 17 refers to the case of horizontal position of the tray 1, in which the position specifying means 140 issues a signal for rotating the motor 142 reversely to rotate the motor 142 reversely, the rack lever 144 moves in the direction of arrow Y2, the rib 145 abuts against the protrusion 146 of the disk engaging portion 5, the disk engaging portion 5 rotates in the direction P2,. and the disk engaging portion 5 sinks. Hence, the disk engaging portion 5 does not interfere, and the disk 92 can be mounted on the mounting surface 42 smoothly.

Instead of the position specifying means 140, a changeover switch may be used, and the driving means 141 may be driven by changing over the changeover switch manually.

According to the second embodiment, if the tray is changed from the vertical position to horizontal position or vice versa, the disk engaging portion 5 can be moved in or out by the signal of the position specifying means 140 without having to manipulate the disk engaging portion 5 directly, so that it is easier to use. Besides, various addition and modifications of the constitution as shown in the first embodiment may be also applied to the second embodiment, and the common actions and effects as shown in the first embodiment may be also obtained.

In the invention, meanwhile, the recording and reproducing apparatus may possess at least only one function of recording and reproducing.

The disk 92 in the foregoing embodiments is an optical disk, but it is also applicable to disks of magnetic recording and reproducing system and other disks.

Incidentally, the difference in height of the disk 92 when mounting the cartridge 90 and disk 92 can be absorbed by pushing up the disk 92 by the turntable 20 to the same height as the disk in the cartridge 90 by rotation of the main chassis 10.

As the invention may be embodied in several forms without departing from the spirit of essential characteristics thereof, the present embodiments are therefore illustrative and not restrictive. The scope of the invention is defined by the appended claims rather than by the description preceding them, and all changes that fall within metes and bounds of the claims, or equivalence of such metes and bounds thereof are therefore intended to be embraced by the claims.

What is claimed is:

1. A recording and reproducing apparatus comprising:
    a turntable engaged with a disk for supporting said disk on a recording and reproducing position,
    a pickup for moving on the surface of said disk to record a signal in said disk or to reproduce a signal from said disk, and
    a flat tray for transferring between an engagement position with said turntable and a disk exchange position, said disk exchange position capable of placing said disk in a substantially vertical position, said tray having a holding surface comprising a cartridge mounting portion for detachably holding a cartridge, said tray having a first side and a second side which are opposite one another and which extend substantially parallel to a tray transfer direction,
    wherein said tray comprises a first disk engaging portion freely movable in the tray transfer direction and being biased in a disk exchange position of the tray, said first disk engaging portion operative for detachably supporting a peripheral edge of said disk or one side of said cartridge, and a second disk engaging portion comprising a first retaining member and a second retaining member, said first retaining member and said second retaining member each having a first position for retaining said disk in said tray in which an upper surface of said disk is disposed beneath said retaining member, and a second position in which said second disk engaging portion is displaced in a recess formed in said holding surface, said first retaining member and said second retaining member positioned on said first side and said second side, respectively, of said tray such that one of said retaining members retains an upper portion of said disk and the other retaining member retains a lower portion of said disk when said tray is set in the vertical direction.

2. A recording and reproducing apparatus of claim 1, wherein said holding surface possesses a disk mounting portion for positioning and mounting the disk when the tray is set in a horizontal position.

3. A recording and reproducing apparatus of claim 1, wherein the disk holding surface of said tray is inclined from a horizontal surface so that the inner side may be higher to avoid abutting of the disk against the turntable, when the disk mounting portion for positioning and mounting the disk, with the tray in horizontal position, moves the tray from said disk exchange position to said recording and reproducing position of disk.

4. A recording and reproducing apparatus of claim 2, wherein the disk holding surface of tray is inclined from the horizontal surface so that the inner side may be higher to avoid abutting of the disk against the turntable, when the disk mounting portion for positioning and mounting the disk, with the tray in horizontal position, moves the tray from said disk exchange position to said recording and reproducing position of disk.

5. A recording and reproducing apparatus of any one of claims 1, 2, 3, or 4, wherein said first retaining member and said second retaining member is aligned along an axis which is substantially perpendicular to the tray transfer direction.

6. A recording and reproducing apparatus of any one of claims 1, 2, 3, or 4, wherein said first retaining member and said second retaining member is disposed outside of the disk mounting portion.

7. A recording and reproducing apparatus of any one of claims 1, 2, 3, or 4, wherein said first retaining member and said second retaining member is disposed in the cartridge mounting portion so as to be free to move in and out.

8. A recording and reproducing apparatus of any one of claims 1, 2, 3, or 4, wherein said first retaining member and said second retaining member is thrust in the projecting direction.

9. A recording and reproducing apparatus of any one of claims 1, 2, 3, or 4, wherein said first retaining member and said second retaining member is disposed in the cartridge mounting portion so as to be free to move in and out, and is thrust in the projecting direction.

10. A recording and reproducing apparatus of any one of claims 1, 2, 3, or 4, wherein said first retaining member and said second retaining member is detachably disposed in the cartridge mounting portion.

11. A recording and reproducing apparatus of any one of claims 1, 2, 3, or 4, wherein said first retaining member and said second retaining member is selectively changed over between the projecting position and sinking position.

12. A recording and reproducing apparatus comprising:
    a turntable engaged with a disk for supporting said disk on a recording and reproducing position,
    a pickup for moving on the surface of said disk to record a signal in said disk or to reproduce a signal from said disk,
    a flat tray for transferring between an engagement position with said turntable and a disk exchange position, said disk exchange position capable of placing said disk in either a horizontal position or vertical position, said tray having a holding surface comprising a cartridge mounting portion for detachably holding a cartridge, said tray having a first side and a second side which are opposite one another and which extend substantially parallel to a tray transfer direction,
    position specifying means for issuing a signal indicating either horizontal position or vertical position of said tray, and
    driving means driven by the signal issued by said position specifying means for controlling the position a first retaining member and a second retaining member in accordance with the physical orientation of the tray,
    wherein said tray comprises a first disk engaging portion freely movable in a tray transfer direction and being biased in a disk exchange position direction of the tray, said first disk engaging portion operative for detachably supporting a peripheral edge of said disk, and a second disk engaging portion comprising said first retaining member and said second retaining member, said first retaining member and said second retaining member each having a first position for retaining said disk in said tray in which an upper surface of said disk is disposed beneath said retaining member, said first retaining member and said second retaining member each being projected from the holding surface by the driving means when the vertical position of the tray is detected by the position specifying means, and a second position in which said first retaining member and said second retaining member are each displaced in a recess formed in said holding surface by said driving means when the horizontal position of the tray is detected by the specifying means, said first retaining member and said second retaining member positioned on said first side and said second side, respectively, of said tray such that one of said retaining members retains an upper portion of said disk and the other retaining member retains a lower portion of said disk when said tray is set in the vertical direction.

13. A recording and reproducing apparatus of claim 12, wherein said holding surface possesses a disk mounting portion for positioning and mounting the disk when the tray is set in horizontal position.

14. A recording and reproducing apparatus of claim 12, wherein the disk holding surface of tray is inclined from the horizontal surface so that the inner side may be higher to avoid abutting of the disk against the turntable, when the disk mounting portion for positioning and mounting the disk, with the tray in horizontal position, moves the tray from said disk exchange position to said recording and reproducing position of disk.

15. A recording and reproducing apparatus of claim 13, wherein the disk holding surface of tray is inclined from the horizontal surface so that the inner side may be higher to avoid abutting of the disk against the turntable, when the disk mounting portion for positioning and mounting the disk, with the tray in horizontal position, moves the tray from said disk exchange position to said recording and reproducing position of disk.

16. A recording and reproducing apparatus of any one of claims 12, 13, 14, or 15, wherein said first retaining member and said second retaining member is aligned along an axis which is substantially perpendicular to the tray transfer direction.

17. A recording and reproducing apparatus of any one of claims 12, 13, 14, or 15, wherein said first retaining member and said second retaining member is disposed outside of the disk mounting portion.

18. A recording and reproducing apparatus of any one of claims 12, 13, 14, or 15, wherein said first retaining member and said second retaining member is disposed in the cartridge mounting portion so as to be free to move in and out.

19. A recording and reproducing apparatus of any one of claims 12, 13, 14, or 15, wherein said first retaining member and said second retaining member is thrust in the projecting direction.

20. A recording and reproducing apparatus of any one of claims 12, 13, 14, or 15, wherein said first retaining member and said second retaining member is disposed in the cartridge mounting portion so as to be free to move in and out, and is thrust in the projecting direction.

21. A recording and reproducing apparatus of any one of claims 12, 13, 14, or 15, wherein said first retaining member and said second retaining member is detachably disposed in the cartridge mounting portion.

22. A recording and reproducing apparatus of any one of claims 12, 13, 14, or 15, wherein said first retaining member and said second retaining member is selectively changed over between the projecting position and sinking position.

* * * * *